(12) United States Patent  (10) Patent No.: US 9,028,162 B1
Lagassey et al.  (45) Date of Patent: May 12, 2015

(54) QUICK RELEASE SYSTEM AND METHOD

(75) Inventors: Paul Lagassey, Vero Beach, FL (US);
David Stott, Port St. Lucie, FL (US)

(73) Assignee: Hurricane Safety Systems, LLC, Vero Beach, FL (US)

( * ) Notice: Subject to any disclaimer, the term of this patent is extended or adjusted under 35 U.S.C. 154(b) by 119 days.

(21) Appl. No.: 12/615,764

(22) Filed: Nov. 10, 2009

Related U.S. Application Data

(60) Provisional application No. 61/113,129, filed on Nov. 10, 2008, provisional application No. 61/113,134, filed on Nov. 10, 2008.

(51) Int. Cl.
| | |
|---|---|
| *F16B 21/09* | (2006.01) |
| *E06B 9/02* | (2006.01) |
| *E05B 65/10* | (2006.01) |
| *E06B 9/00* | (2006.01) |
| *F16B 5/02* | (2006.01) |

(52) U.S. Cl.
CPC ............. *E06B 9/02* (2013.01); *Y10T 403/598* (2015.01); *E06B 2009/005* (2013.01); *E05B 65/1033* (2013.01); *F16B 5/0208* (2013.01); *Y10T 403/587* (2015.01); *Y10S 403/04* (2013.01)

(58) Field of Classification Search
CPC ..... E06B 2009/005; E06B 9/06; E05B 65/00; E05B 65/10; E05B 65/1033
USPC .............. 52/127.8, 202, 203; 403/109.6, 294, 403/318, 319, 322.2, 324, DIG. 4; 49/57, 49/463, 141, 464, 465; 411/103, 107, 315, 411/424
See application file for complete search history.

(56) References Cited

U.S. PATENT DOCUMENTS

| | | | | |
|---|---|---|---|---|
| 3,426,819 | A * | 2/1969 | Estes et al. .................... | 411/360 |
| 4,055,360 | A * | 10/1977 | Russi ............................ | 292/228 |
| 4,070,048 | A * | 1/1978 | Young ........................... | 292/179 |
| 4,208,837 | A * | 6/1980 | Black et al. ...................... | 49/56 |
| 4,616,863 | A * | 10/1986 | Bryant ......................... | 292/302 |
| 5,316,357 | A * | 5/1994 | Schroeder ...................... | 296/36 |
| 5,328,311 | A * | 7/1994 | Knohl ........................... | 411/353 |
| 5,661,935 | A * | 9/1997 | Erickson et al. ................ | 52/202 |
| 5,918,430 | A * | 7/1999 | Rowland ........................ | 52/202 |
| 6,205,713 | B1 * | 3/2001 | Thompson et al. ............. | 49/465 |
| 6,502,355 | B1 * | 1/2003 | Bori ............................... | 52/202 |
| 6,585,467 | B2 * | 7/2003 | Junkers .......................... | 411/204 |
| 6,661,662 | B2 * | 12/2003 | DeNardis ....................... | 361/709 |
| 6,991,399 | B2 * | 1/2006 | Park et al. ...................... | 403/355 |
| 7,114,901 | B2 * | 10/2006 | Maruyama et al. ............ | 411/353 |
| 7,415,806 | B2 * | 8/2008 | Davidson ....................... | 52/426 |
| 7,438,336 | B1 * | 10/2008 | Wolf et al. ..................... | 49/141 |
| 7,526,896 | B1 * | 5/2009 | Lohmeyer et al. ............. | 52/202 |
| 7,559,715 | B2 * | 7/2009 | Germain et al. ............... | 403/294 |
| 7,766,573 | B1 * | 8/2010 | Wolf et al. ..................... | 403/325 |
| 7,823,342 | B1 * | 11/2010 | Van Horn Steel et al. ... | 52/127.8 |
| 7,827,744 | B2 * | 11/2010 | Wenrick et al. ................ | 52/202 |

(Continued)

*Primary Examiner* — Daniel P Stodola
*Assistant Examiner* — Matthew R McMahon
(74) *Attorney, Agent, or Firm* — Steven M. Hoffberg; Ostrolenk Faber LLP

(57) ABSTRACT

A system and method for a quick release of a second object from a first object, e.g., quick release of hurricane panels (second object) from the inside of a habitable structure (first object). A stepped quick release bolt assembly or a dual quick release car assembly may be employed. In the preferred embodiment, a pin passing through a cross bored hole in a stepped bolt disposed in a receiving structure attached to a first object is releasable in order to disconnect the second object from the first object.

40 Claims, 35 Drawing Sheets

(56) References Cited

U.S. PATENT DOCUMENTS

| | | | |
|---|---|---|---|
| 8,046,967 B2* | 11/2011 | Suare et al. | 52/506.06 |
| 8,091,285 B1* | 1/2012 | Wolf et al. | 49/463 |
| 8,419,332 B2* | 4/2013 | Kochheiser | 411/412 |
| 2004/0154242 A1* | 8/2004 | Hudoba et al. | 52/202 |
| 2005/0072533 A1* | 4/2005 | Vincent | 160/133 |
| 2006/0175365 A1* | 8/2006 | Sandler | 224/201 |
| 2006/0283131 A1* | 12/2006 | Wolf et al. | 52/698 |
| 2007/0000193 A1* | 1/2007 | Beaupre et al. | 52/202 |
| 2007/0101666 A1* | 5/2007 | Munch | 52/202 |

* cited by examiner

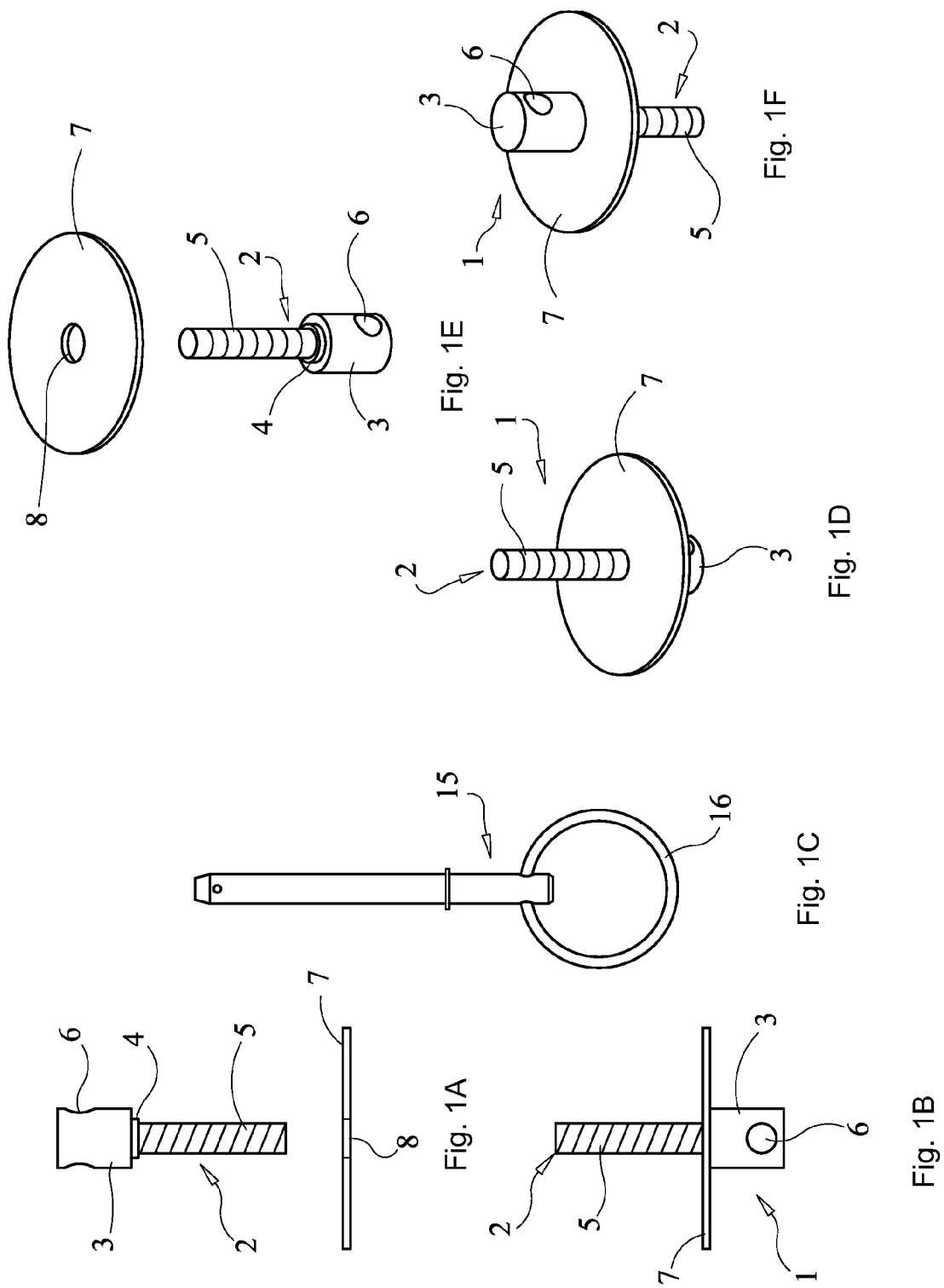

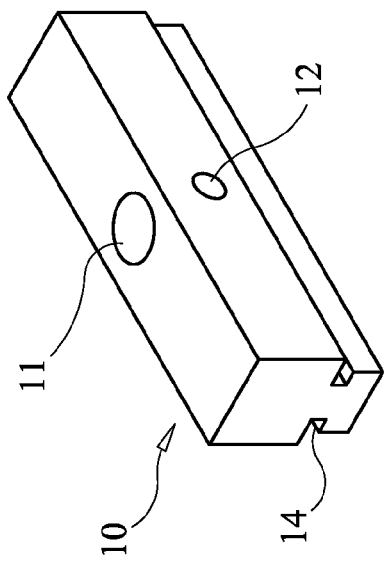
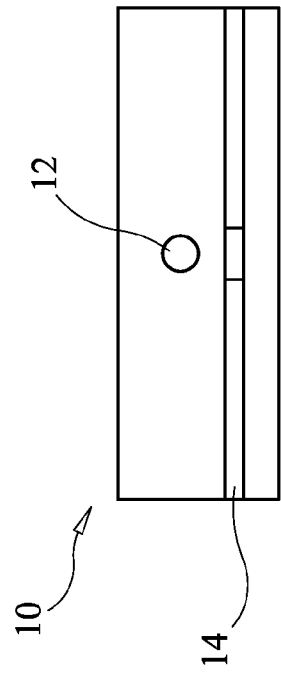
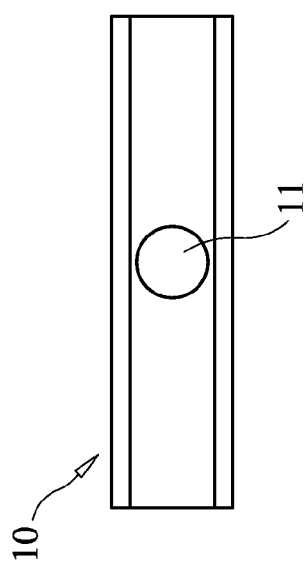
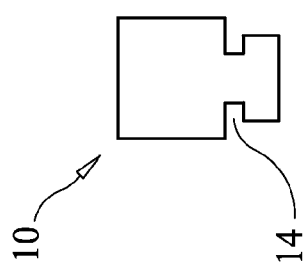
Fig. 2C
Fig. 2D
Fig. 2A
Fig. 2B

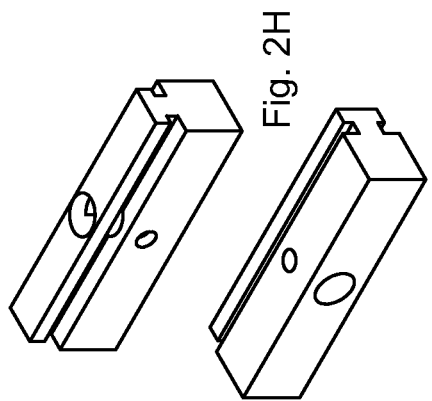
Fig. 2H
Fig. 2I
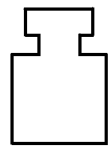
Fig. 2J
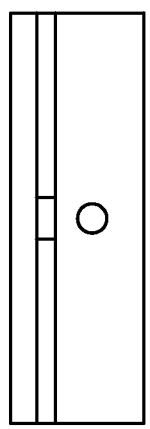
Fig. 2F
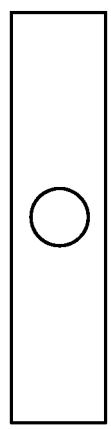
Fig. 2G
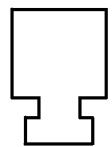
Fig. 2E

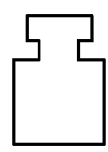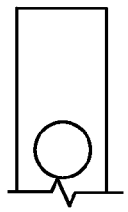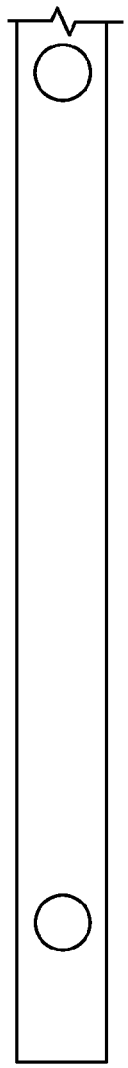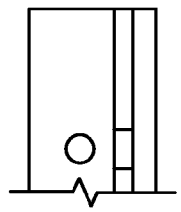

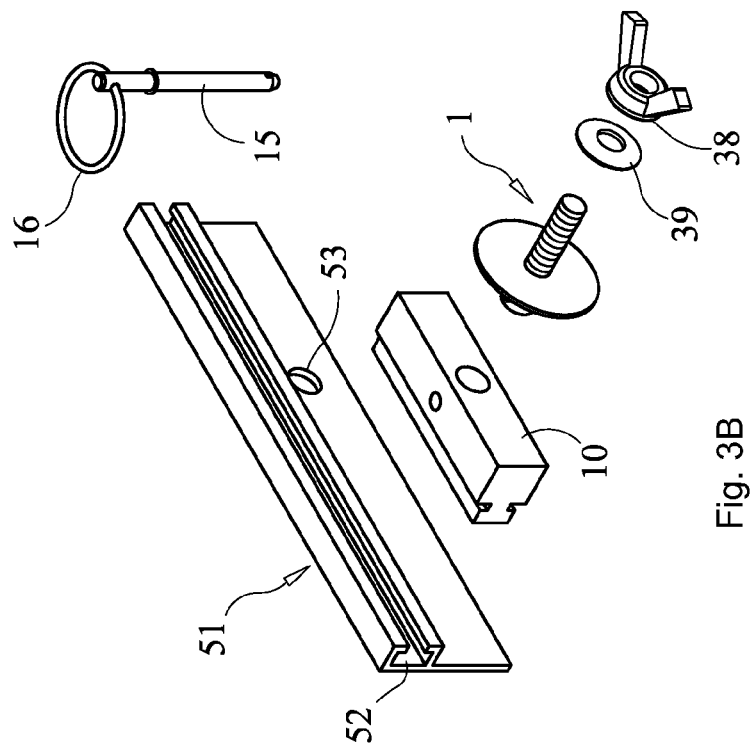
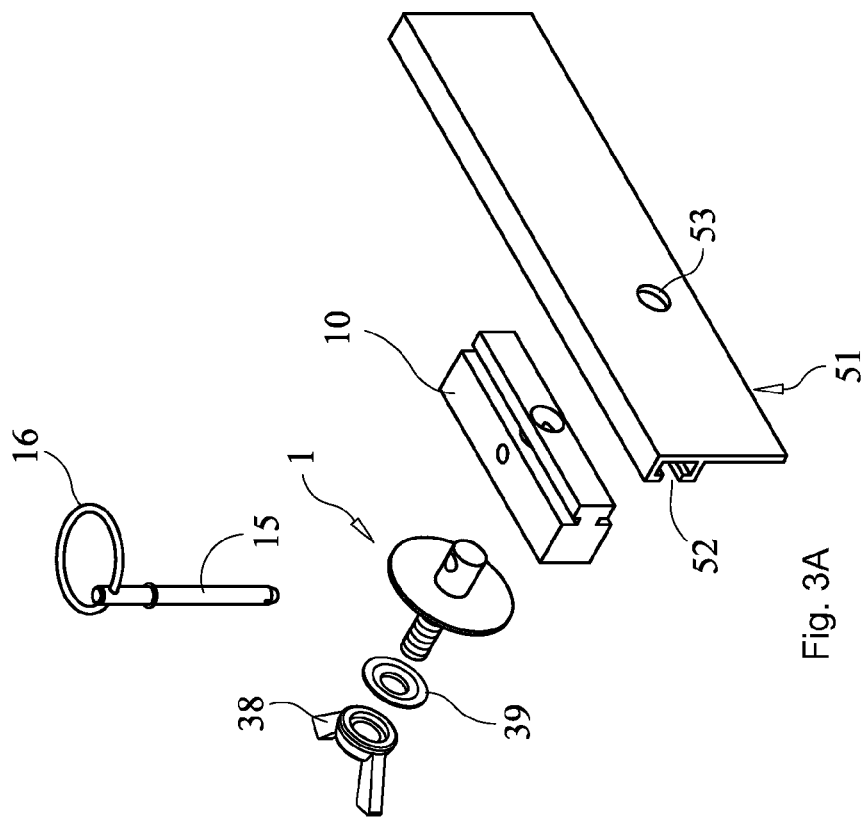
Fig. 3B
Fig. 3A

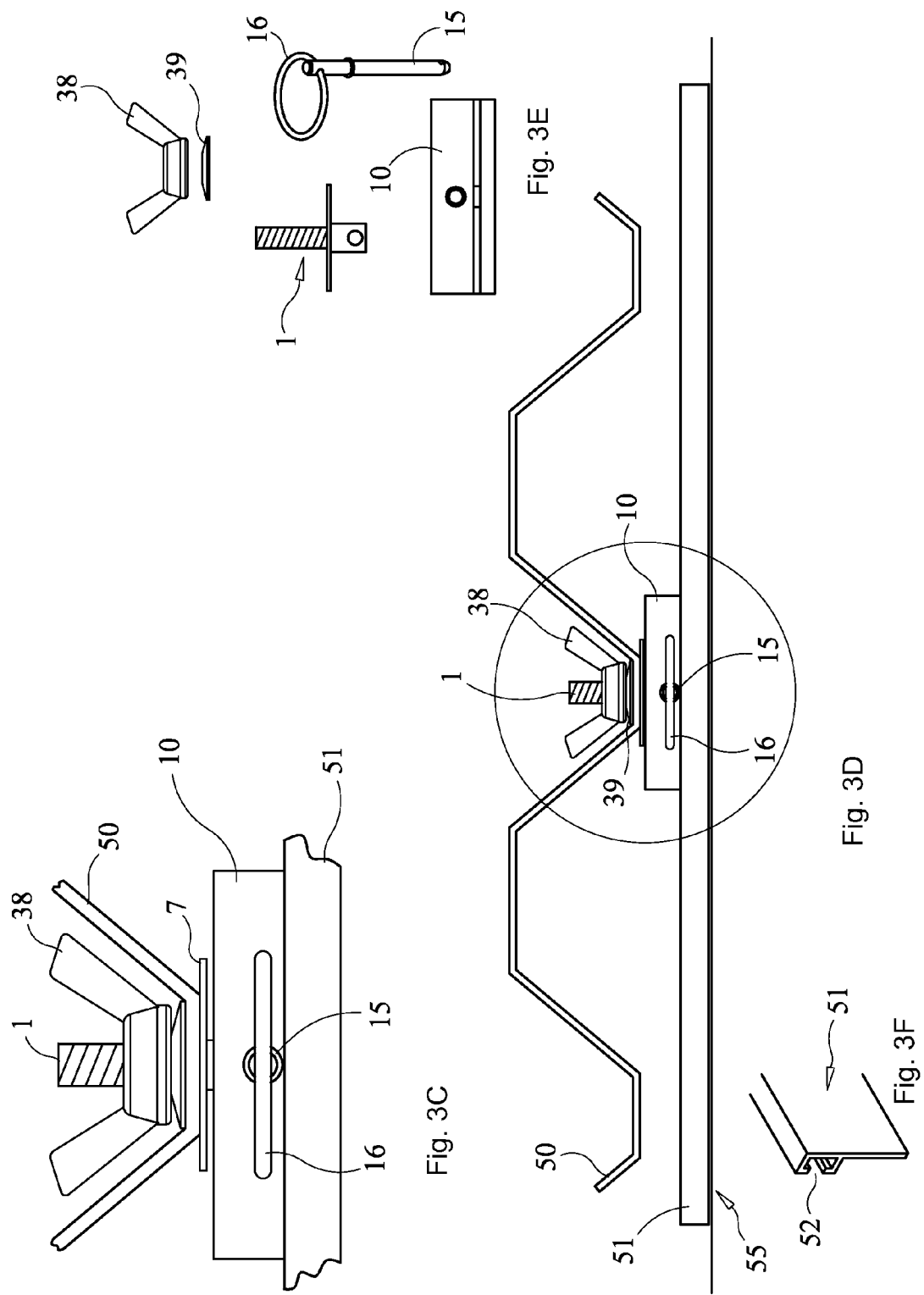

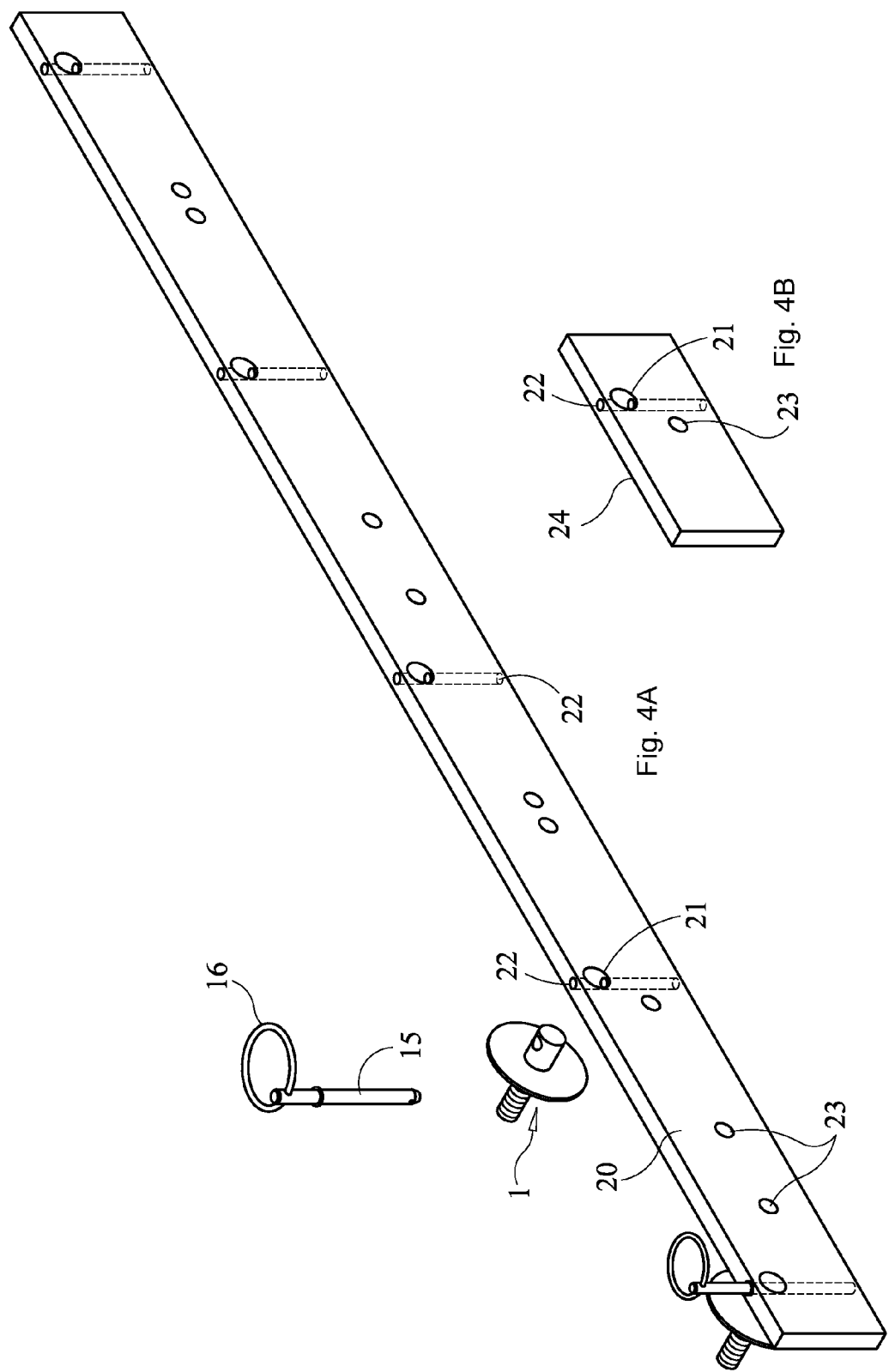

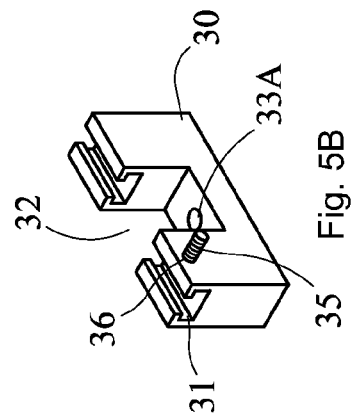
Fig. 5B
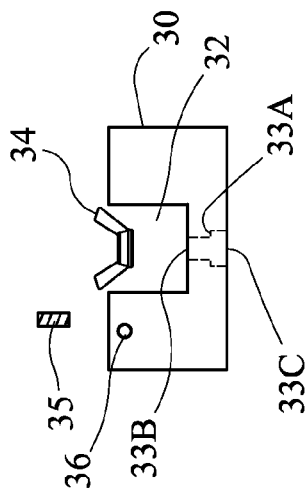
Fig. 5A
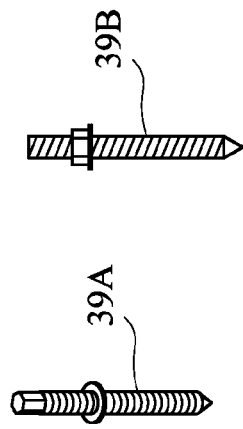
Fig. 5C
Fig. 5D

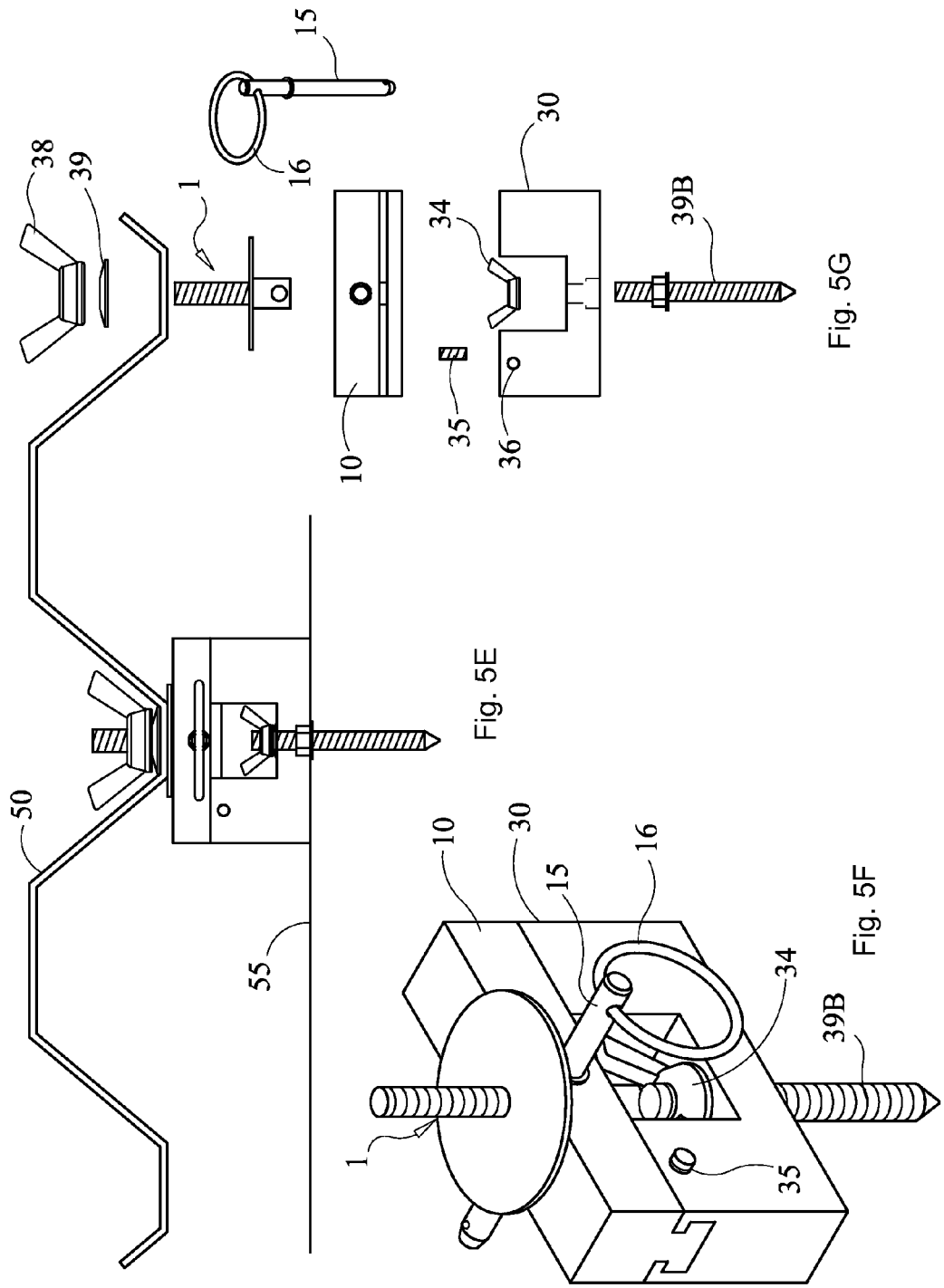

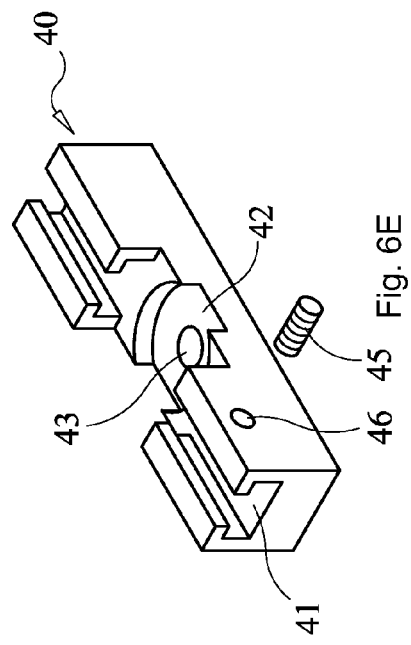
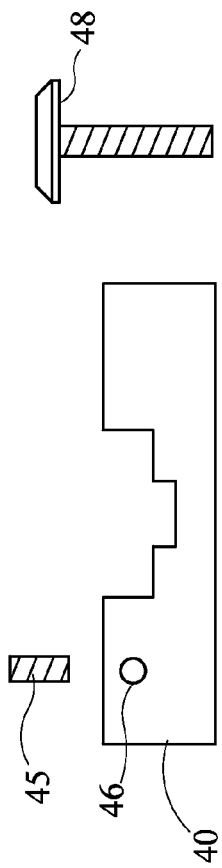
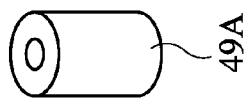
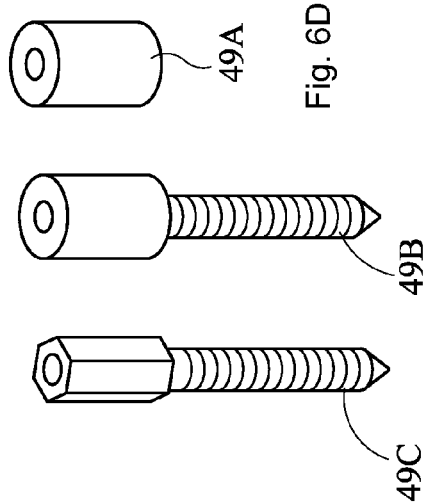

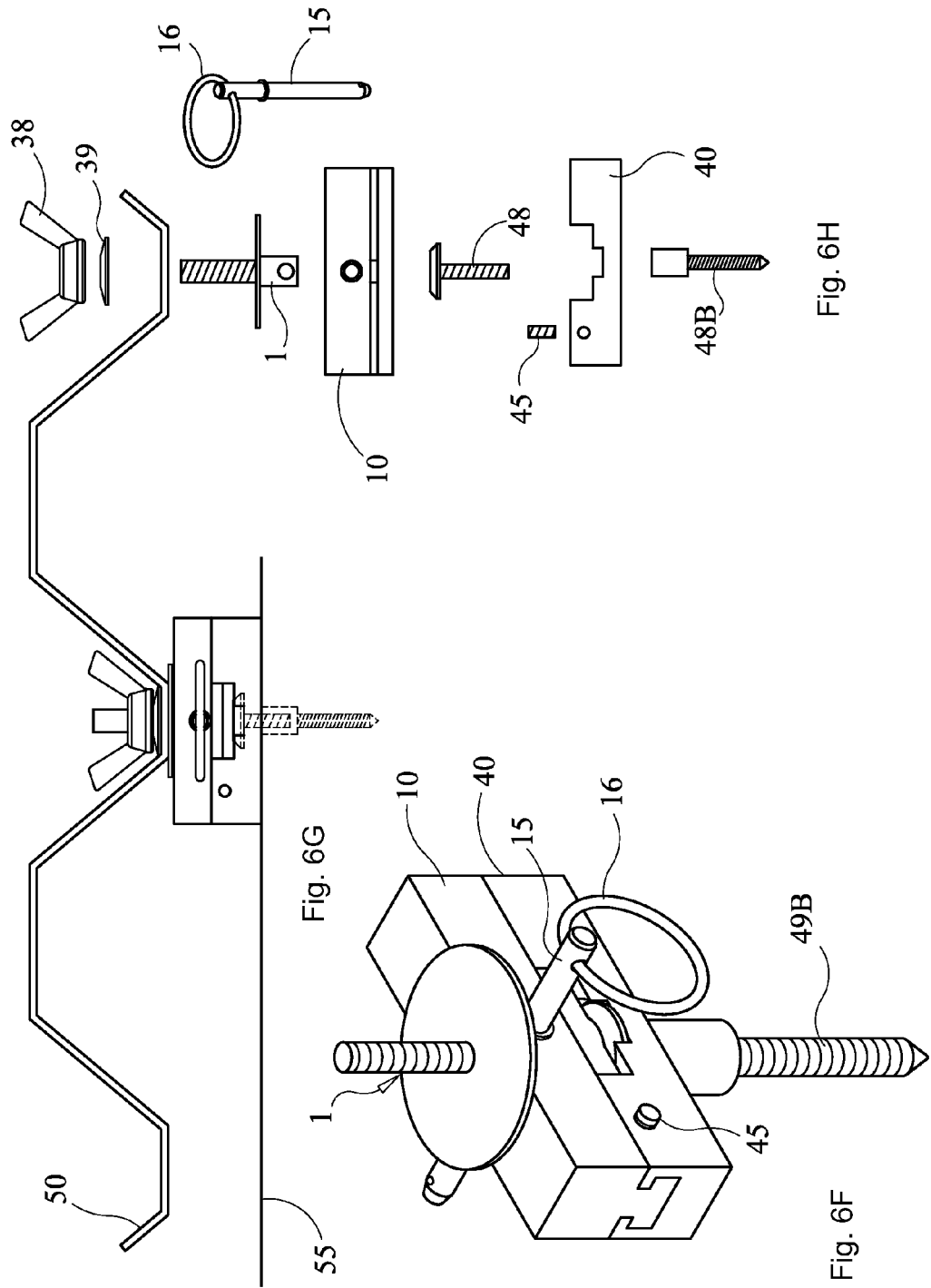

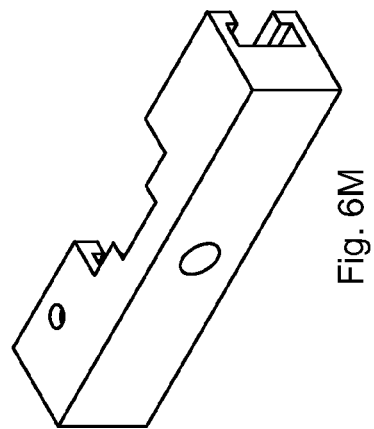
Fig. 6M
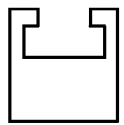
Fig. 6N
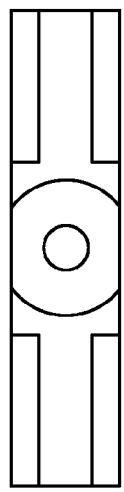
Fig. 6J
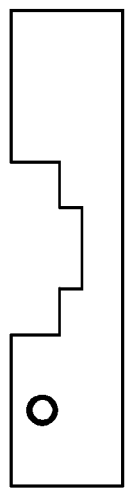
Fig. 6K
Fig. 6L
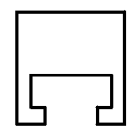
Fig. 6I

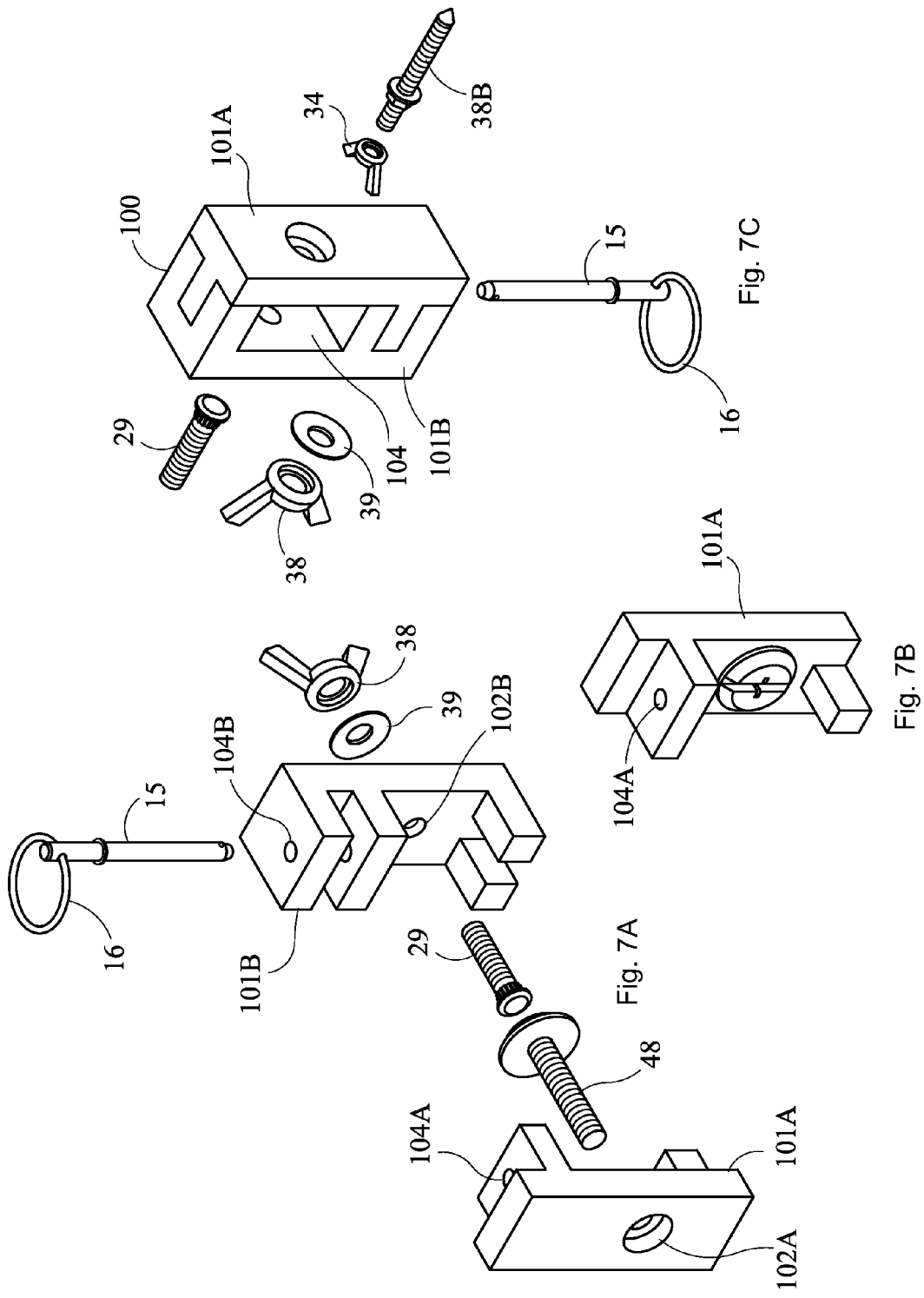

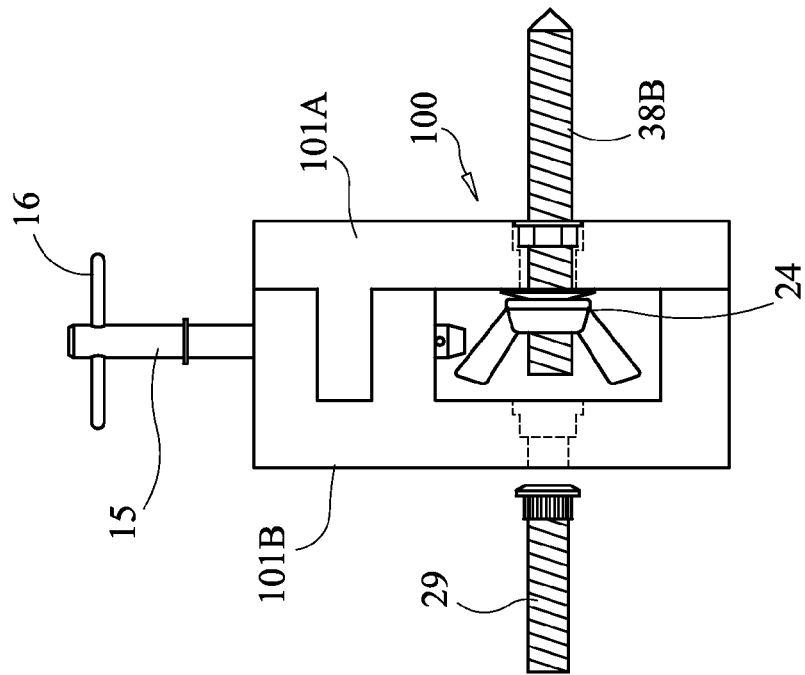
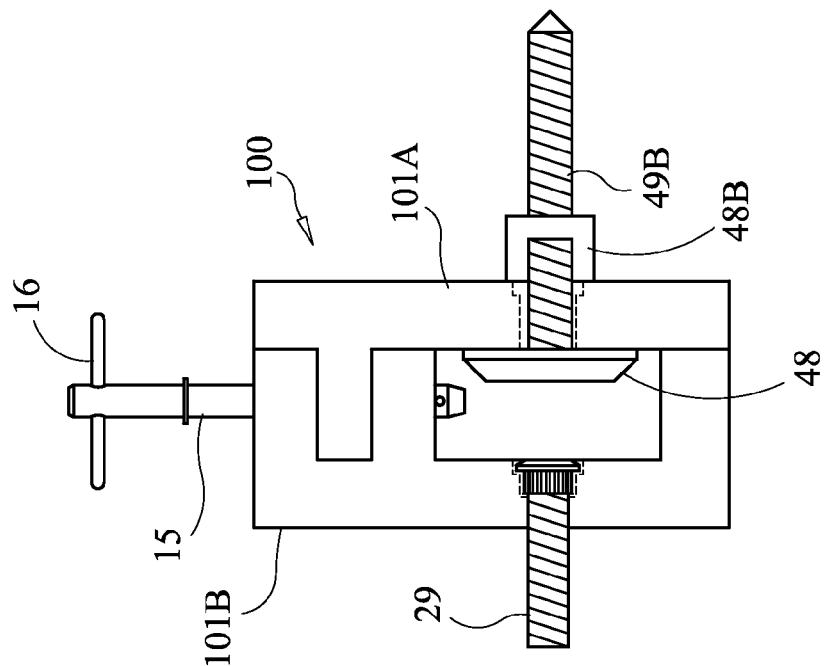

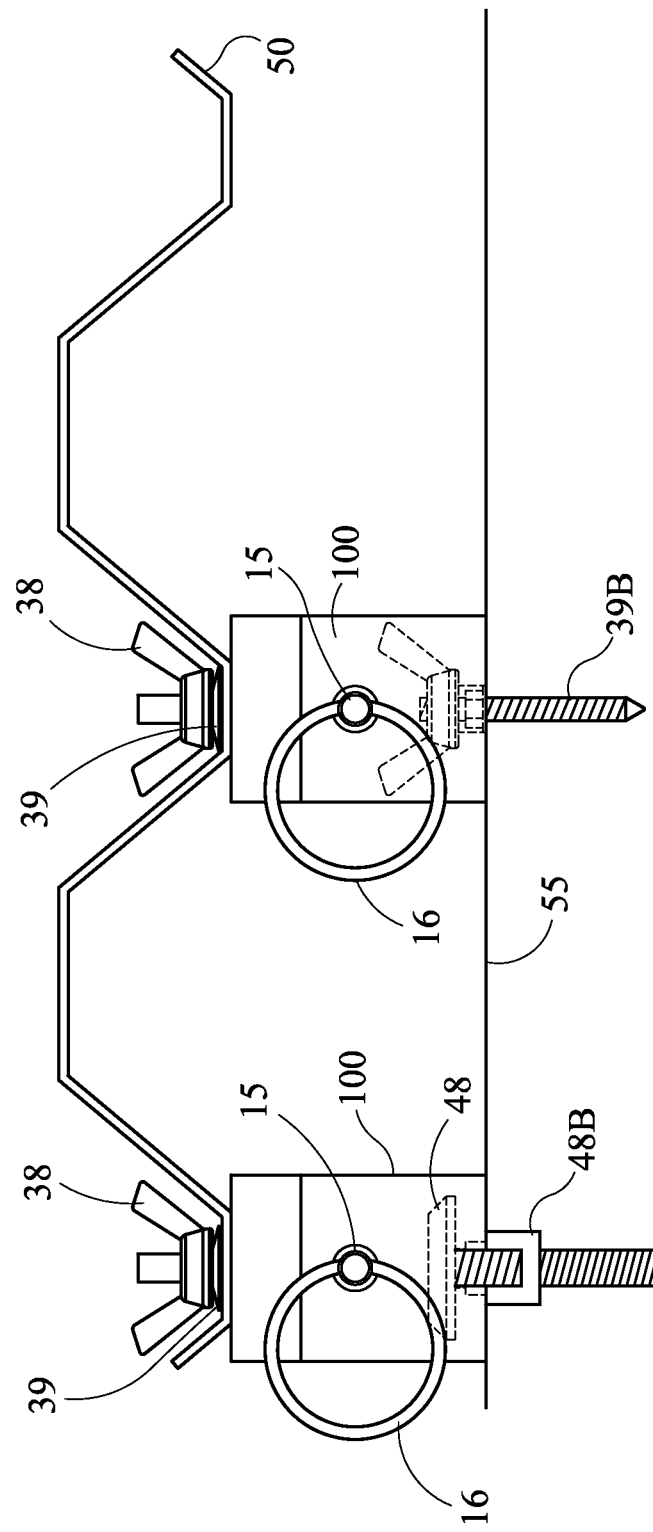

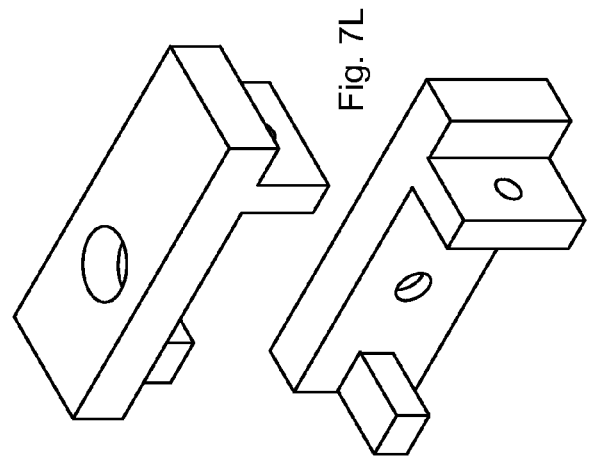
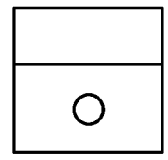
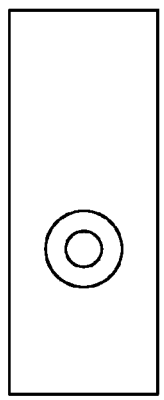
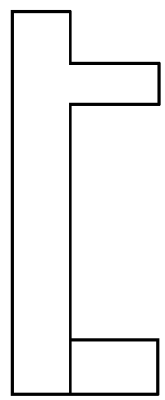
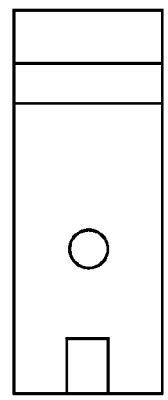
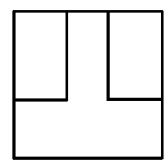

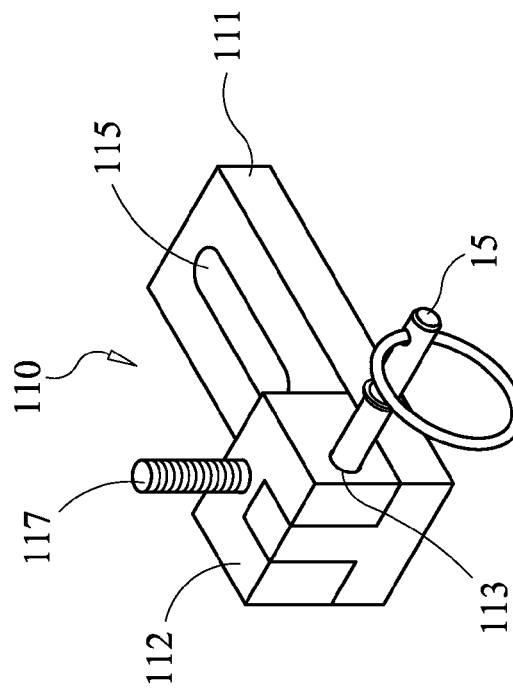
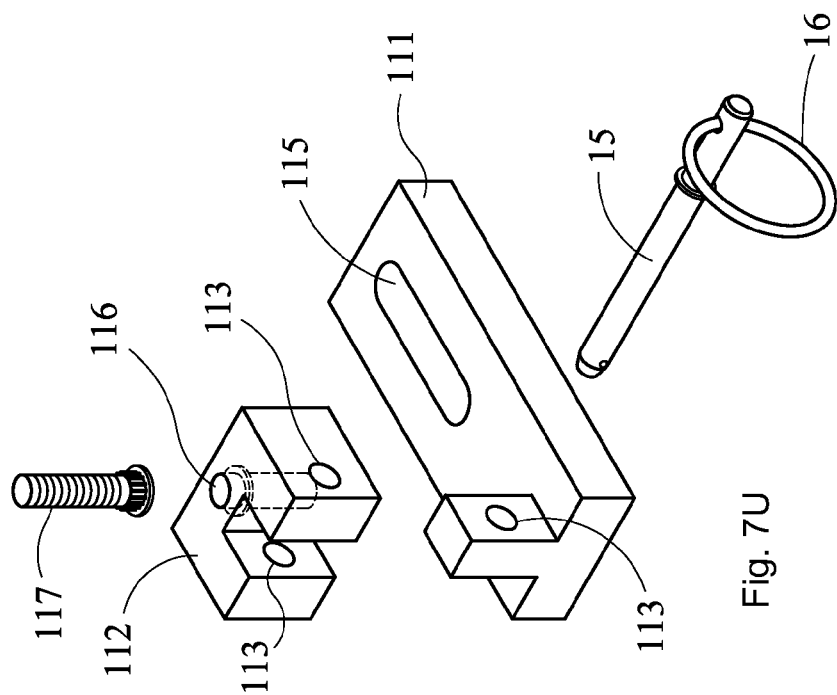
Fig. 7U
Fig. 7V

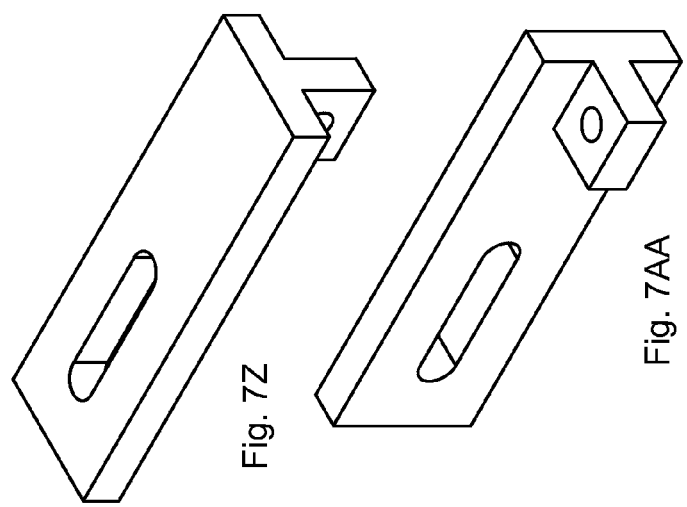
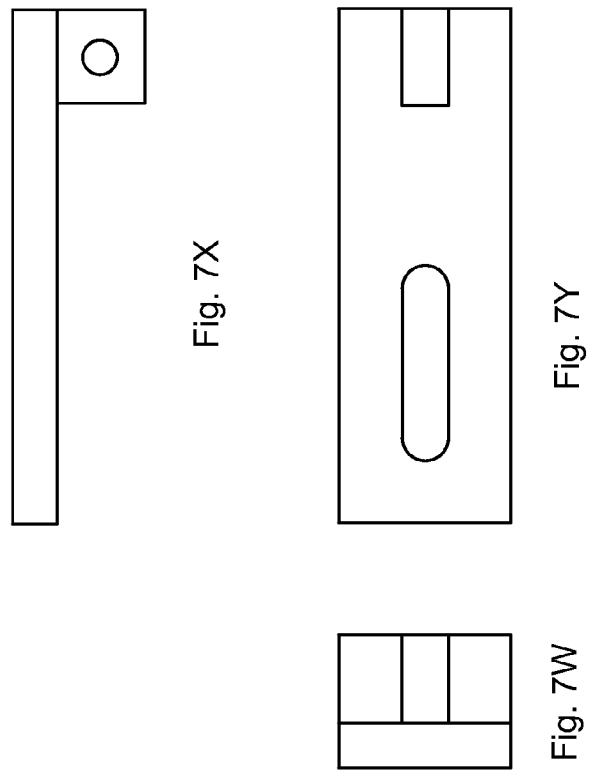
Fig. 7Z
Fig. 7AA
Fig. 7X
Fig. 7Y
Fig. 7W

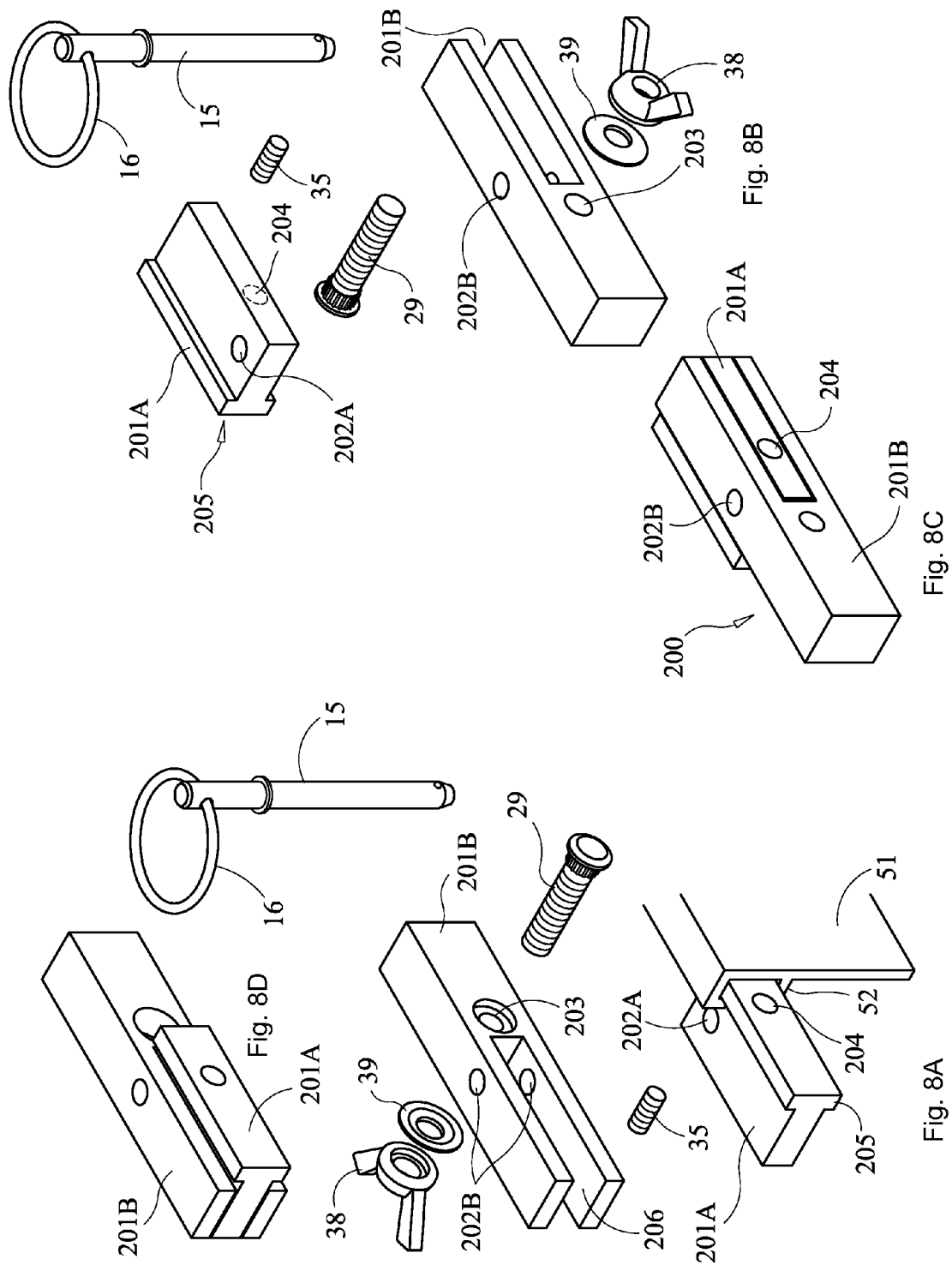

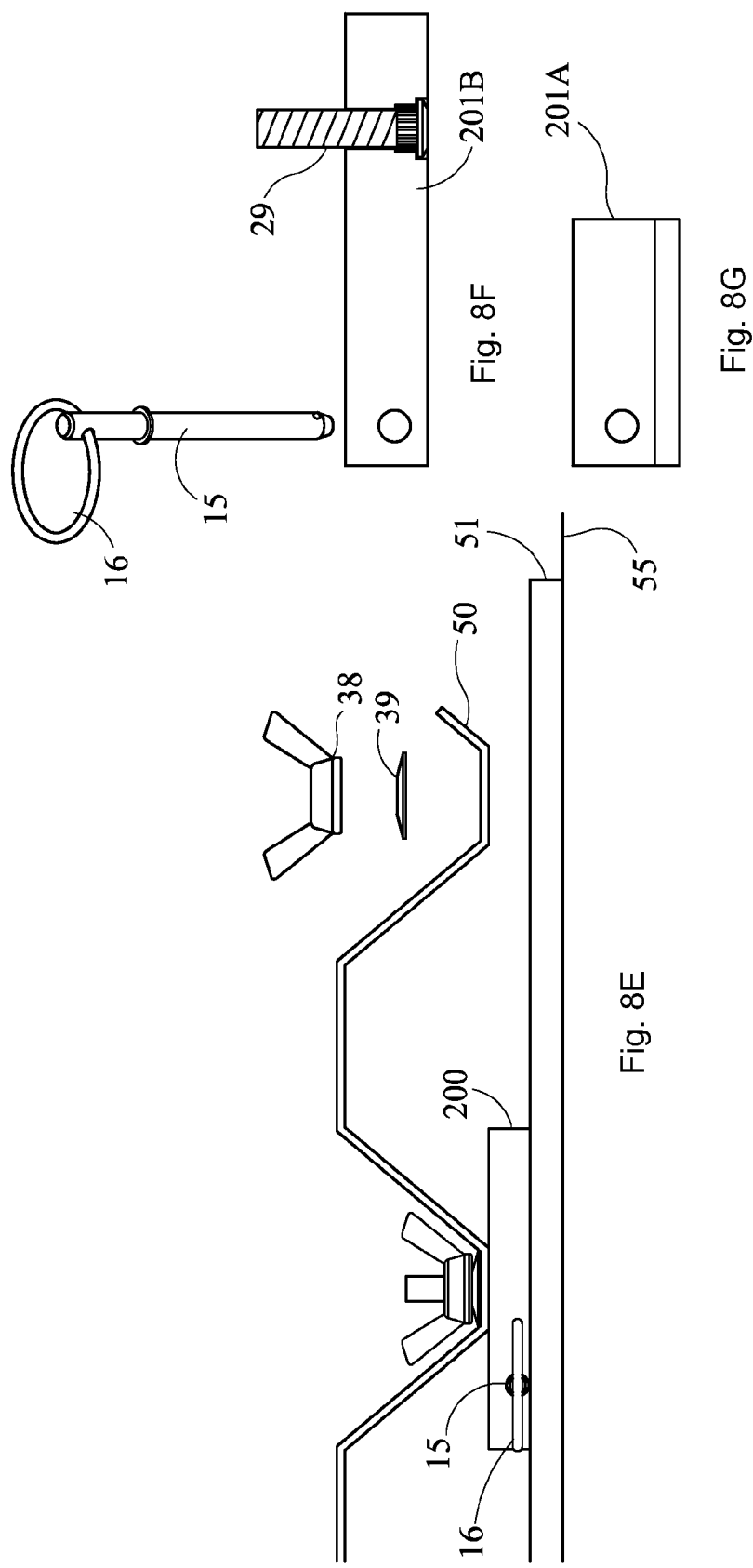

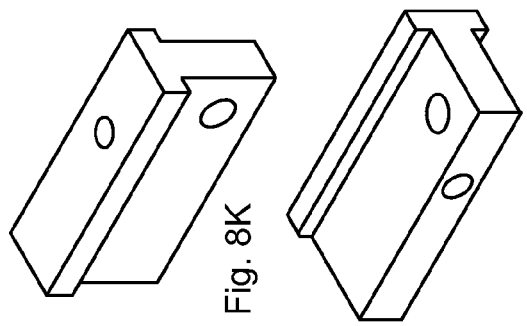
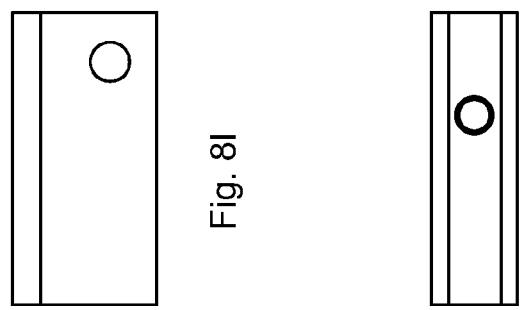
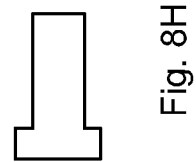

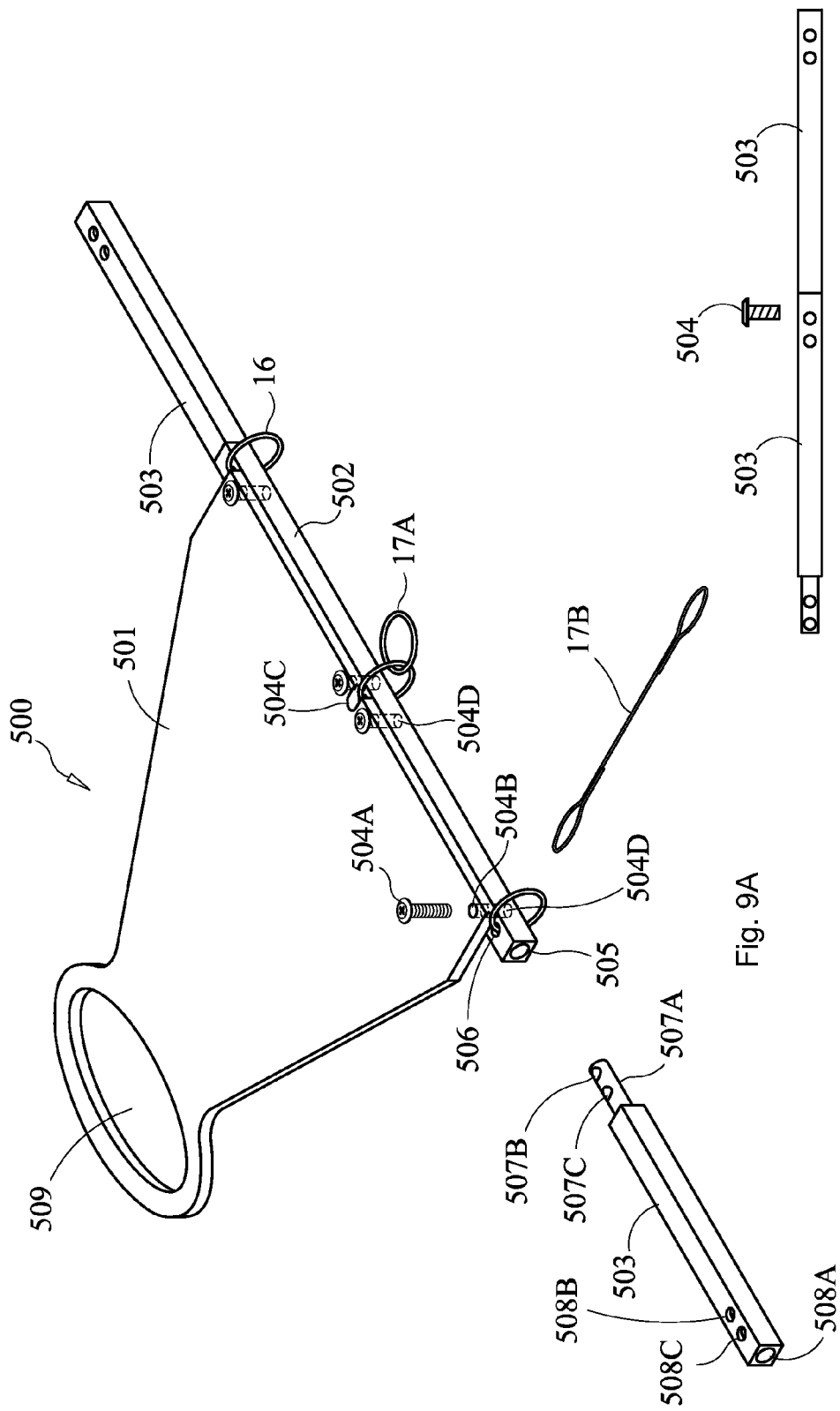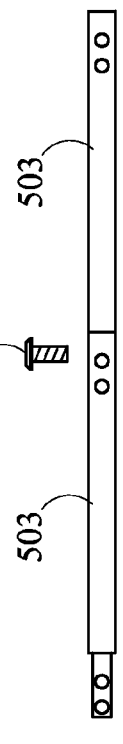
Fig. 9A
Fig. 9B

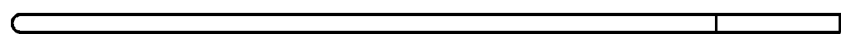
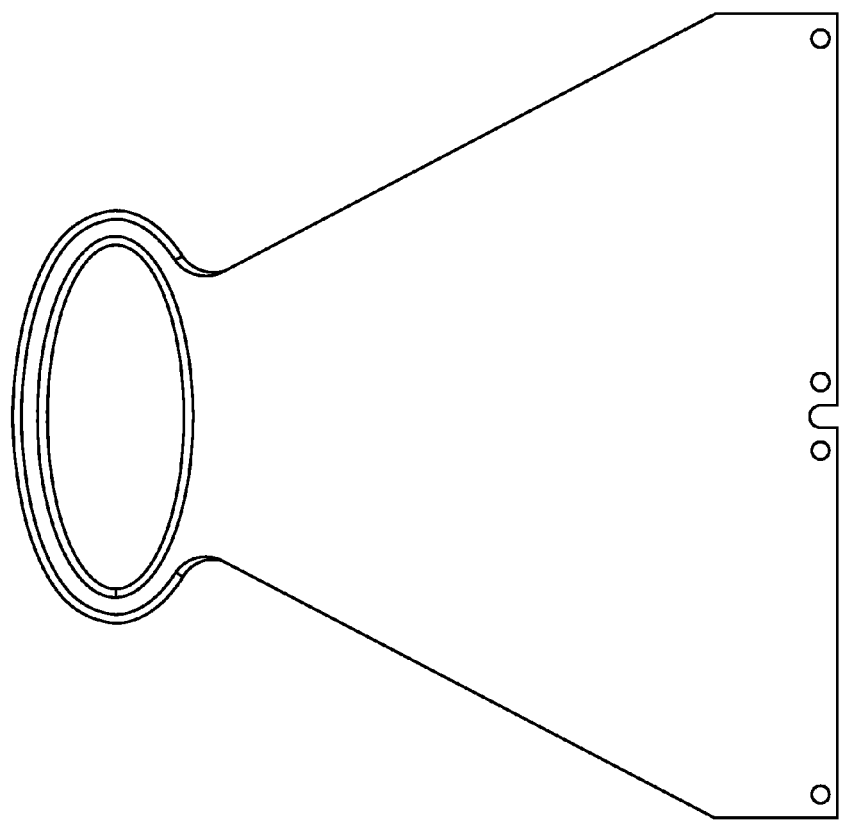
Fig. 9D
Fig. 9C

QUICK RELEASE SYSTEM AND METHOD

REFERENCE TO RELATED APPLICATIONS

The present application claims benefit of priority under 35 U.S.C. §119(e) from U.S. Provisional Application 61/113,129, filed Nov. 10, 2008, which is expressly incorporated herein by reference in its entirety for all purposes, and U.S. Provisional patent application 61/113,134, filed Nov. 10, 2008, which is expressly incorporated herein by reference in its entirety for all purposes.

FIELD OF THE INVENTION

In general, the invention relates to securely attaching with the ability to quickly release a second object to and from a first object, and in particular hardware for hurricane panel installation and quick removal, particularly mounting systems and methods which, while securely fastening the panel to the structure, permit removal of the hurricane panels from the inside of a structure quickly and easily. Hurricane panels are typically attached on and from the outside of a structure and are not removable from inside the structure. This system provides a means to release the panels from the inside of the structure, thus providing additional means of egress, should the primary means of egress become unusable.

BACKGROUND OF THE INVENTION

If a structure is occupied when hurricane panels are installed, it is necessary to have at least one opening where the hurricane protection system can be secured and removed from inside the structure. Furthermore, it is preferable, and mandatory in most jurisdictions, to have at least one alternate means of egress from the structure. Many jurisdictions require a means of egress from all bedrooms or at least more than one means of egress in new construction and new installations of hurricane panels. While other, more expensive hurricane protection systems such as accordion shutters can be opened and closed from the inside of a structure, hurricane panels typically can only be attached or removed from outside of the structure. However, the costs of other hurricane protection methods, such as accordion shutters, are often substantially more than basic hurricane panels, and are beyond the financial reach of many homeowners.

In recent years, many local governments in hurricane prone regions have mandated in their building codes that all new structures must have hurricane protection. Some coastal counties have further mandated that all structures, new or existing, have hurricane protection installed. Furthermore, most insurance companies either require or offer significant discounts for the installation of hurricane protection. Of the many approved hurricane protection products available, hurricane shutter panels are usually the most affordable. With the proliferation of hurricane protection products and the related government and insurance requirements, more people will install and rely on their hurricane protection. As a result, less people will evacuate and more people will stay in their homes during a storm. The incidence of fires during power failures is much higher as a result of the use of lamps and candles. As more people stay in shuttered homes during hurricanes, it is likely that more people will need egress from their homes in an emergency. While many local governments require installation of hurricane protection, they also require emergency egress. While the most popular and affordable, approved means of hurricane protection is hurricane panels, one major draw-back of hurricane panels is that they can usually only be installed and removed from the outside of a structure. Other systems for providing hurricane protection such as roll down or accordion shutters, and high impact glass, which can be opened and closed from inside a building, are substantially more expensive than hurricane shutter panels. The instant invention solves this problem by facilitating the quick release of hurricane shutter panels from inside a structure with minimal additional costs. The system works in conjunction with industry standard hurricane hardware and installation methods and provides an affordable solution to creating emergency egress through openings protected by hurricane shutter panels.

When mounting hurricane panels utilizing this invention, at least one panel or series of panels covering a window or door opening is mounted in a way that allows the panel(s) to be securely mounted, yet be removed from the inside of the protected structure. This permits egress from the structure through openings normally blocked when hurricane panels are installed. Typically, only one door opening is the primary means of egress from the structure. Enabling the removal of hurricane protection from the inside of the structure usually involves more expensive hurricane protection products such as accordion shutters. While it is desirable to have more than one means of egress in case the primary means of egress becomes unusable, many home or business owners choose to use the much more affordable hurricane panel rather than alternate approved protection systems which often cost five to fifteen times as much per square foot as panels. The present invention seeks to overcome these limitations by providing a hurricane panel mounting system and method that can be used in conjunction with industry standard installation techniques. The invention described herein permits hurricane panels, mounted with or without mounting track, to be securely fastened yet removed from within the structure. The system and method of the present invention may, for example, work with standard installation tracks and accessories, as well as existing direct mount systems, and is typically reusable.

Industry Standard Methods of Attaching a Hurricane Panel or Protective Cloth to a Structure Female Hardware—Anchors recessed into the wall of a structure with a threaded female opening for receiving a bolt. Examples are machine screw anchors, Sammys®, female Panelmates and female inserts.

Male Hardware—Studs screwed into a wall with the male threaded end protruding for receiving a wing nut. Examples are Tapcon SG™, male Panelmates, Panelmate Plus SS, Panelmate Pro and TVAS Anchors.

H-Header or U-Header/Channel Track—One end of panels, often the top, as installed, typically slide into the channel in these types of track. H-Header or U-Header/Channel track are typically used at one end of an opening (typically the top) with Studded Angle Track, F-Track or Male/Female methods of attachment being used at the other end of the opening (typically the bottom). This is useful for minimizing the number of wing nuts which must be used to attach the hurricane shutter panels thus simplifying and speeding up the installation process. Build out U-Header has an extension which extends the track channel away from the surface of the structure. Build-out H-Header is typically used with openings which require the channel to be spaced away from the wall to clear copings or window sills.

Studded Angle Track—The panels are attached to knurled bolts which are pressed into the track. Studded angle track is typically attached to the wall of the structure or to a step or sidewalk which may abut the structure.

F-Track—In standard installations of hurricane panels, the panels are attached to F-Track utilizing specialized track bolts (or regular hex bolts) which slide in and out of the bolt channel in the F-Track, allowing flexibility of panel mounting locations and the track bolts to be removed when not in use. Wing nuts are typically used to attach the panels to the track bolts. Build-out F-Track has an extension which extends the F-Track channel away from the surface of the structure. Build out F-Track is for use with openings which require the F-Track channel to be spaced away from the wall, for example when the space is necessary to clear a coping or window sill. In the present invention, the panels are attached to quick cars which themselves have a protruding track channel and which when in use are placed in the F-Track channel in place of track or hex bolts

SUMMARY OF THE INVENTION

U.S. Pat. No. 7,823,342, expressly incorporated herein by reference, teaches four embodiments for attaching hurricane panels to a structure; an embodiment for each of four attachment methods. In the original application, a first embodiment is designed for use with studded angle track, a second embodiment is designed for use with F-Track, a third embodiment is designed for use with direct mount systems that use machine screw anchors, and a fourth embodiment is designed for use with direct mount systems that use bolts mounted directly into a structure. These four embodiments are not interchangeable between mounting methods, and some of the embodiments depend on the release of components which are located outside of the structure and thus prone to failures which cannot be addressed from within the structure.

It is an object of the present invention to overcome some of the limitations of the embodiments disclosed in the original application by locating the release components of the system to the interior, protected side of the panels. Location of the release components to the inside side of the panels enables any system failures to be addressed from inside the structure, where such component are readily accessible, and protects system components from possible damage which may occur during a storm event.

It is another object of the present invention to enable the use of common parts across multiple means of attaching hurricane shutters to a structure. For example, the stepped quick release bolt assembly, the various dual car assemblies of the present invention can be used across multiple embodiments of the invention.

It is a further object of the invention to have assemblies comprising components which can be used across multiple platforms for attaching hurricane panels to a structure, thus making it more suitable for use with existing installations.

It is a further object of the invention to use a minimal number of parts needed across multiple platforms and to maximize the use of standard off-the-shelf parts wherever possible, thus reducing the cost and complexity of the invention.

Finally, it is a further object of the invention to avoid deviation from standard, building code approved methods for attaching hurricane shutter panels to a structure. In compliance with this objective, the instant invention does not require any modifications to existing installation hardware or panels.

The benefits of embodiments disclosed in this application are that most parts can be used with more than one means of installation. Therefore, the number of parts is fewer and the embodiments make more use of standardized parts which are readily available off-the-shelf. For example, the stepped quick release bolt assembly as disclosed below is capable of using standard ¼-20 wing nuts that come with most standard installations of hurricane panels.

Further, the embodiments presented herein are adapted to attach and release hurricane panels to and from a structure under the most common of installation methods.

While the main object of the invention relates to hurricane panels, the invention disclosed herein can be used in other applications for a attaching and releasing any object to and from another object.

Finally, this application also introduces terminology not explained in the original application. This terminology is intended to simplify explanation and understanding of the invention.

Before going on, an overview of the terminology used in this application will facilitate our description of the invention. Following that is a brief discussion of industry standard hurricane panel installation hardware and methods that will further enhance the reader's understanding.

TERMINOLOGY

Hard Panel—The term "hard panel" refers to the panels which are attached to the structure using conventional means. Hard panels cannot be removed from inside of the structure, and remain attached even after "soft panels" (see below) are released.

Soft Panel—The term "soft panel" refers to the panels which are attached to the structure using assemblies of the invention, to facilitate quick and easy release and removal of such soft panels from inside the structure.

Inboard Side—The "inboard side" of a hard panel is the side that makes contact with, and is overlapped by, the soft panel.

Outboard Side—The "outboard side" of a hard panel is the side opposite the inboard side. The "outboard side" of a soft panel is the side that makes contact with the inboard side of a hard panel, if present, otherwise, is the side closest to the opening perimeter.

Stepped Quick Release Bolt Assembly—The components of the stepped quick release bolt assembly as assembled. The stepped quick release bolt assembly is used with the first embodiment, and can be assembled either with quick release track or single quick release cars.

Single Quick Release Car—A single car having a bolt and pin hole and a female F-Track channel for use with the stepped quick release bolt of the first embodiment. The single car can be mounted directly into F-Track or into adapters for use with installations using direct mount or studded angle track.

Quick Release Track—A track designed for use with the stepped quick release bolt of the first embodiment, having a series of bolt and pin holes corresponding to the stepped quick release bolt and the number and placement attachment points corresponding to the number of panels being installed.

Quick Car Assembly—A series of two cars attached together with a pin. One car is mounted on a track or structure, the other car is used to attach the track and is released from the assembly when the pin is extracted.

Hard Car—One of two cars in the Quick Car Assembly that attaches to a track or structure and remains attached when the panels are released.

Soft Car—One of two cars in the quick car assembly which attaches to the hard car with a pin, and is released from the hard car when the pin is extracted. The panel(s) to be released are secured to a series soft cars. When the pins are extracted, the soft cars are released from the hard cars together with the attached panels.

End Car—A dual car assembly designed to fit between a hard and soft panel at their attachment point, thus enabling the use of a series of dual car assemblies to be used in conjunction with a combination of hard panels and soft panels. The hard car of the end car assembly holds the hard panel securely in place, while the soft car enables the soft panel to be released. The assembly of the end car creates space between the last connection point of a soft panel or series of soft panel and a hard panel, thus enabling the pin to be extracted from the assembly to release the soft panel.

REFERENCES

The description of the present invention refers to numerous conventional hardware components used for installing hurricane shutters. A good reference for these hardware components is found in the All Points Screw, Bolt, & Specialty Co. of Pompano Beach, Fla., Hurricane Hardware Catalog which is publicly available on their website. Some useful references in this catalog are:

Nuts and Bolts:
Sidewalk Bolts—Page 48
Washered Wing Nuts—Page 51
Knurled Bolts (for Studded Angle Track)—Page 51
Track Bolts (for F-Track)—Page 52
Also note that Home Depot sells regular hex nuts in packages for use as track bolts.
Female Methods of Attachment (Anchors Recessed into a Wall with a Threaded Female Opening for Receiving a Bolt Such as a Machine Bolt or Sidewalk Bolt):
Machine Screw Anchors—Page 49
Sammys®—Page 60
Female Panelmate and Female Insert—Page 61
Male Methods of Attachment (Studs Screwed into a Wall with the Male Threaded End Protruding for Receiving a Wing Nut):
Tapcon SG™—Page 60
Male Panelmate, Panelmate Plus SS, Panelmate Pro, TVAS Anchor—Page 61

Likewise, the description of the present invention refers to numerous conventional types of hurricane panel mounting tracks. A good reference for types of tracks used to install hurricane panels is found on the Hurricane Depot, Miami Fla. website which is publicly available. According to this reference, common types of hurricane shutter panel tracks include 2"×2" Studded Angle, H-header (For 2" panels), U-Channel Header, 2"×2" Reverse F Track, Flat F-track, 2"×2" Reverse Studded Angle, 1" Build-out U-header, 2" Build-out U-header, 3" Build-out U-header, 1" Build-out F-track, 2" Build-out F-track, and 3" Build-out F-track.

Moving on now, the following is a description of the two preferred embodiments of the present invention.

A first embodiment provides for a system and method of a "stepped quick release bolt assembly" which is an improvement over the embodiments disclosed previously in the first embodiment of U.S. Pat. No. 7,823,342, and the provisional patent application 61/032,427 filed on Feb. 29, 2008, which is expressly incorporated herein by reference. This stepped quick release bolt assembly is designed to be attached to a structure with either of a quick release track or single quick release cars. In the event of quick release track, the quick release track is attached directly to a structure. In the event of a single quick release car, the single quick release car is either disposed in an F-Track attached to a structure, or disposed in adapters for male or female hurricane hardware which are attached to a structure. Alternately, this single quick release car can be adapted to be attached directly to a structure.

As compared to U.S. Pat. No. 7,823,342 a preferred embodiment of the stepped quick release bolt has three diameters, and at least one end with a larger diameter than that of the quick release bolt disclosed in the first embodiment of the original application referenced above. The use of a larger diameter bolt enables the use of a larger diameter pin, which together withstand greater stresses than the bolt and pin of the original application, thus enabling the invention to be constructed with hardware that perhaps exceeds the stress tolerances of current industry standard bolts used in hurricane shutter installations.

This preferred embodiment of the stepped quick release bolt assembly of the present invention is also the preferred because it uses a minimal number of parts, it is simple to assemble, and can be configured for use with existing installations and hardware found in the most common hurricane panel installation methods. For example, the stepped quick release bolt can be adapted with ¼-20 thread on the second end so it can be used with the standard ¼-20 thread of the wing nuts used in typical hurricane panel installations. It can be used with a section of quick release track (disclosed further below), or with a series of single quick release cars, also disclosed below.

When used with the quick release track, the track of the preferred embodiment has multiple combinations of first and second holes corresponding to multiple attachment points on at least one hurricane panel, and this quick release track replaces the section of standard track normally used to attach the hurricane panels.

When used with a single quick release car, multiple single quick release cars are used to attach a single panel, and the preferred embodiment of the single quick release car has a single combination of first and second holes and is disposed with a male channel that corresponds to the female channel in F-Track such that the single quick release car can be disposed in an F-Track.

Various adapters permit the use of the preferred embodiment of the single quick release car in direct mount installations, thereby enabling a single part to be used with more than one type of installation system. The two preferred embodiments of these adapters are for use with installations that utilize either female hardware (for example, female Panelmates, Sammys or machine screw anchors) or male hardware (for example, male Panelmates, Tapcons or similar studs). If desired the adapter for male hardware components can also be used with studded angle track and female hardware, thereby providing a single solution for adapting the single quick release car to three industry standard installation methods for hurricane panels. Alternately, instead of using an adapter, a variation of the single quick release car can be adapted to be attached directly to a structure by eliminating the male F-Track channel and adding a hole for attaching the single quick release car to direct mount male or female hardware.

Unlike some of the prior art, the stepped quick release bolt assembly of the present application overcomes the potential failures that can result from over tightening, it is simple having a minimal number of parts, makes use of some existing industry standard components of hardware found in typical installations, and is adapted for use with the most common of existing installation methods for hurricane panels. In addition, the stepped quick release bolt assembly and the attachment method of the present invention do not require any modification of the hardware used in existing installation systems (such as drilling additional holes in track or panels), thereby avoiding the deviation from building code requirements which are inherent in some of the other embodiments discussed in the prior applications. Most of the parts and materials are standard and commonly available, and each embodiment is adapted for use across a variety of installation methods.

In this preferred embodiment, the stepped quick release bolt has three diameters. A first diameter at a first end; a second diameter in the middle portion; and a third diameter at the second end. The diameter of the first end is larger than the diameter of the second end. The diameter in the middle portion is sized between the diameter of the first end and second end.

When assembled, the first end of the stepped quick release bolt is disposed in a quick release track or single quick release car and connected with a pin. The quick release track and the single quick release car not only serve as the hardware for connecting the stepped quick release bolt to a structure, but also serve to provide some space between the structure and the panel to make room for the pin and for connecting the pin to the extraction mechanism so the pin can be extracted from within the structure.

A quick release track is a section of track which represents an entirely new design, particularly with respect to hurricane panel track. This quick release track is adapted to accommodate the stepped quick release bolt with a series of first holes sized to accommodate the first end of the stepped quick release bolt, and a series of corresponding second holes cross-bored to the first holes, the second holes corresponding to the hole in the first end of the stepped quick release bolt, both of which are sized to accommodate a pin. If a quick release track is used, the quick release track is attached to the structure, and multiple stepped quick release bolt assemblies corresponding to the number of panels and attachment points are disposed in bolt holes within in the quick release track.

In use with the stepped quick release bolt, the single quick release car is adapted with a first hole for accommodating the first end of the stepped quick release bolt. A second hole for accommodating a pin is cross-bored through the first hole. Each single quick release car is disposed with one stepped quick release bolt assembly placed within the first hole in each single quick release car, and a pin is passed through the second hole. The number of single quick release cars used in an installation corresponds to the number of panels and attachment points to be connected using the present invention. The single quick release cars are disposed in F-Track which is attached to a structure, or in direct mount applications within adapters that are attached to a structure, thus becoming connected to the structure. If used, some embodiments of these adapters can also be used with studded angle track attached to a structure. The bolts and pins may be inserted in the single quick release cars either or before they are connected to the structure.

The position of the pin hole in the stepped quick release bolts and the corresponding second holes in the quick release track or single quick release cars correspond in a way such that the pin holes in the stepped quick release bolts align with the pin holes in the quick release track or single quick release car. Thus when a stepped quick release bolt is inserted into a first hole in a quick release track or single quick release car and the hole in the first end of the stepped quick release bolt is aligned with the corresponding second hole, the pin can be inserted through the second hole and into the stepped quick release bolt, which then becomes attached to the quick release track or single quick release car. When the pin is extracted, the stepped quick release bolt is released from the assembly, thereby releasing the corresponding attachment point of the panel to the structure, and the panel is released for removal at that point. When a series of stepped quick release bolts are so used to attach one or more panels, when all the pins are extracted, all the stepped quick release bolts are released and the panel or panels is/are likewise released from the structure and can be removed.

The construction and use of the stepped quick release bolt, quick release track and single quick release car assemblies are discussed in more detail below and the functionality will become clear from this discussion and the corresponding figures.

The relationship between the length of the first end of the stepped quick release bolt, the cross bored hole in the stepped quick release bolt, the depth of the quick release track or single quick release car and the position of the second cross-bored hole in the quick release track or single quick release car are such that a portion of the first end, and all of the middle portion and second end protrude beyond the surface of the quick release track or single quick release car in which the bolt is attached. This protrusion on the first end of the bolt is referred to as the shoulder.

Ideally, the protrusion of the shoulder in the first end of the stepped quick release bolt provides only a minimal extension beyond the surface of the quick track or single quick release car. The minimal space provided by this shoulder is ideally sufficient to provide only enough space to prevent the force of tightening a nut or wing nut on the second end of the bolt and the panel from exerting its force on bolt, the pin and the surface of the quick release track or single quick release car, while leaving minimal space for distortion of the assembly should the panel or the stepped quick release bolt be struck by an object during a storm event. Although the space provided by the shoulder can be greater than minimal, ideally a minimal space is preferred. This is because when metal is bent it typically springs back beyond its maximum bend. The use of only a minimal space at this point minimizes the potential bend that could occur if an object were to strike the exposed portion of the stepped quick release bolt or the surrounding assembly, thereby protecting the system and method from failure. The minimal space provided by the shoulder leaves little space for distortion to immediate portion of the panel surrounding the stepped quick release bolt and likewise leaves little space for distortion of the first end of the stepped quick release bolt. Any such distortion is stopped by the closely adjacent surface of the quick release track or single quick release car, and the forces of any distortion that does occur are released to a degree when the metal bends back. Thus the forces of distortion in the event of a strike are arrested and released by this design which serves to prevent the pin from becoming bound in the assembly to an extent where it cannot be extracted without unreasonable force.

Moving on with the description of the first embodiment, the diameter of the middle portion of the stepped quick release bolt is sized to be less than the diameter of the first end, and at least the diameter of the second end, although in the preferred embodiment the diameter of this middle portion is slightly larger than the diameter of the second end. In the preferred embodiment, a washer or fender washer disposed with a hole having an inside diameter sized so that the washer or fender washer fits over the second end of the stepped quick release bolt and can be pressed on to the middle portion of the stepped quick release bolt such that it rests on the shoulder of the first end.

Ideally, the length of the middle portion of the stepped quick release bolt need only correspond to the thickness of this washer or fender washer, although it could be more or less. This washer or fender washer should be of sufficient thickness and of sufficient outside diameter to provide a surface on which to support and attach the panel, such that when a nut or wing nut is placed on the second end of the bolt and tightened, the panel is held securely in place on the stepped quick release bolt without exerting any force on the quick release track or single quick release car, the first end of the bolt and the pin. This design prevents the pin from becoming bound in the assembly, and allows the pin to be extracted freely even if the nut or wing nut is over-tightened on the second end of the stepped quick release bolt.

In a variation of this design, the stepped diameter of the middle portion of the stepped quick release bolt can be larger than the diameters of the first and second ends. In this variation, the stepped quick release bolt is constructed as a single component, with the middle diameter taking the place of the pressed-on washer or fender washer. It should also be noted that in this variation, the second end of the stepped quick release bolt can be less than or greater than the diameter of the first end, although there is no logical reason for this.

While in the preferred embodiment, the shape of the first end and the middle portion of the stepped quick release bolt and corresponding first hole in the quick release track and single quick release car are round, it should be recognized that all or a portion of either or both of the first end and middle portion could have another shape, such as rectangular, square, hex or keyed, and if so the corresponding holes in the quick release track or single quick release car should have a corresponding shape. One of these other shapes, particularly a keyed shape, might be preferable for aiding in the alignment of the pin holes and preventing the bolt from rotating while the pin is being inserted, and in the case of a keyed shape, allowing the stepped quick release bolt to be inserted only one way in order for the pin holes to align. However, it is noted that aligning the holes when inserting the pin is relatively easy. Further it is noted that manufacturing of the bolt and the bolt holes in the track and car with other than round shapes may be more labor intensive and costly under currently mainstream methods of manufacture. As so noted, these possible variations have no real functional, manufacturing or cost benefit, and are thus not preferred.

Likewise, the washer or fender washer that is pressed on to the middle portion of the stepped quick release bolt in the preferred embodiment does not necessarily need to be pressed on. It may be desirable in some variations for this washer or fender washer to be maintained as a separate component that is put in place at the time of assembly or if desired the washer can be held in place by being welded on. In one such embodiment of this variation, the middle portion of the stepped quick release bolt can be of the same diameter as the second end, or the middle portion can be eliminated all together leaving only a first and second end with the washer or fender washer going over the second end and resting on the shoulder of the first end.

Either or both of the outside dimensions and inside dimensions of the washer or fender washer can have a shape other than round provided that it is supported by the shoulder on the first end of the stepped quick release bolt, and provided that its size and configuration give adequate support to adjacent portion of the panel when the nut or wing nut on the second end of the stepped quick release bolt is tightened down on panel.

Further, while it is preferred to have the fender washer pressed on to the middle portion of the stepped quick release bolt because it conveniently keeps the two components together and insures proper assembly, it should be noted that this is not necessary. In variations of the preferred embodiment, the washer or fender washer can be maintained as separate components and placed on the stepped quick release bolt at the time of installation. If this variation is used, then the middle portion of the stepped quick release bolt can be of any diameter that is less than the first end of the stepped quick release bolt, including being the same diameter as the second end, and provided that the washer or fender washer can pass freely over the second end and come to rest on the shoulder of the first end. Further note that in this variation, the middle portion can be eliminated all together and the stepped quick release bolt can have only a first and second end with the washer or fender washer coming to rest on the shoulder of the first end. This variation is a simpler embodiment, but the main reasons why it is not preferred is because having all the components (the bolt and fender washer) as one assembly facilitates and simplifies installation, and most important prevents human error by insuring the components are installed in the proper sequence. For example, in a variation where the fender washer is not pressed on or otherwise part of the stepped quick release bolt assembly, it is possible for the user to omit the fender washer or to install it on the incorrect side of the panel. This human error in conjunction with over tightening of the wing nut on the panel will result in pressure being exerted on the stepped quick release and this pressure will cause the pin to bind thereby preventing extraction and causing the system to fail. In an emergency this could result in serious injury or death to the occupant(s) of a structure needing to rely on the quick release of the panels in order to exit the structure. Providing the two components (the stepped quick release bolt and the fender washer) as one assembly eliminates the potential for failures that could be caused by human error, and is therefore preferred.

In a further variation of the preferred embodiment, the stepped quick release bolt can be used without a washer or fender washer, provided that diameter of the first end is larger than the mounting holes in the panel, so that the panel will be supported by the shoulder of the first end of the stepped quick release bolt. However, this is not preferred because the required diameter of the first end of the stepped quick release bolt would have to be substantially larger than the diameter of the first end of the stepped quick release bolt of the preferred embodiment, and consequently the size of the single quick release car would have to be substantially increased as sell. This would result in bulky components and increased cost of manufacture without gaining any benefit in functionality over the preferred embodiment.

Further, the depth of the first hole in the quick release track and the single quick release car into which the first end of the stepped quick release bolt is inserted can be the full or partial depth of the respective track or car. If desired, the depth of this first hole can correspond to the length of the first end of the stepped quick release bolt so that when the stepped quick release bolt is inserted into the first hole on the quick release track or the single quick release car the insertion will stop at a point where the center axis of the cross-bored hole in the first end of the stepped quick release bolt aligns with the center of the second cross-bored hole on the track or car, thereby aiding in the alignment of the pin holes and insertion of the pin. While this is desirable, the alignment of these holes during assembly is not difficult and the added benefit may not warrant the added cost of such precision.

Finally, while the panel can be secured to the stepped quick release bolt with only a nut or a wing nut, the use of an optional washer placed between the panel and the nut or wing nut may be desirable.

Returning to the preferred embodiment, the diameter of the second end of the stepped quick release bolt is less than the diameter of the first end and middle portion, and is disposed with a thread corresponding to a nut or wing nut that will be used with the installation to fasten the panel to the assembly. When a series of stepped quick release bolts are attached to a structure using a quick release track or single quick release car, a hurricane panel or series of hurricane panels can be installed over the stepped quick release bolts and secured therewith to the structure such that the panel or panels can be quick released from within the structure by way of extracting the pins, which releases the stepped quick release bolts and the panels at the corresponding points of attachment.

Preferably, the stepped quick release bolt is used with one of a quick release track or a single quick release car.

In the preferred embodiment, the invention is used to attach and quick release hurricane panels (the second object) to and from a structure (the first object), and is further used proximate an opening in the structure to provide quick release of the hurricane panels thus allowing egress through the opening. When attaching multiple hurricane panels, it should be noted that some of the attachment holes in the panels will overlap. Thus while a typical panel may have three mounting holes on at least one end, and two panels separately will have six mounting holes, when the panels are mounted together, one set of mounting holes where the two panels meet will overlap and accordingly only five points of attachment are required for those two panels. So, typically the number of attachment points for a series of panels is three for the first panel, plus two for each additional panel. So, one panel will require three attachment points, two panels will require five, and three panels will require seven, etc.

When used with a quick release track, the quick release track is of a length and disposed with a number of bolt and cross-bored pin holes combinations corresponding to the position and number of attachment points for the number of hurricane panels being attached with the stepped quick release bolt, with consideration being given to overlapping points between multiple panels and the quick release track is attached to the first object, which in the preferred embodiment is a structure, and the location of attachment is proximate an opening in the structure. Ideally, the number of panels attached with the stepped quick release bolt assembly is two, although the system will accommodate more or less panels. If a quick release track is used, the section of quick release track is installed directly on the structure instead of or in place of existing standard F-Track, studded angle track or other type of track. Although the use of a single track with multiple combinations of first and second holes is the preferred embodiment, a variation employs a series of shorter sections of quick release track, each disposed with a single first and second hole, and each attached to the structure separately.

If a series single quick release cars are used, the number of single quick release cars must correspond to the number of panels and attachment points on those panels with consideration given to overlapping points in multiple panels. In its preferred embodiment, the single quick release car is constructed for use with conventional F-Track which is attached to a structure. The single quick release car is disposed with first hole going from front to back, the first hole being for accommodating the first end of the stepped quick release bolt. The single quick release car is further disposed with a corresponding second cross-bored second hole for accommodating the pin which goes from top to bottom. The back side of the single quick release car is disposed with a male F-Track channel on the back side. This male F-Track channel sized to mate with the female channel in the F-Track, and a series of quick release cars are disposed in the F-Track at points corresponding to the attachment points of the panel or panels being attached for quick release. Although preferably, a single quick release car is used for each attachment point of a panel or panels, in a variation of the preferred embodiment, one long single quick release car with multiple bolt and pin holes corresponding in length to the number and attachment points of the panels being installed can also be used with F-Track.

In systems using male or female direct mount hardware, the single quick release car can be placed in an adapter which is designed to be attached to the male or female hardware in the center, and which has a corresponding female F-Track on both ends. These adapters are configured to support the male or female hardware and the hardware used to attach the same, and have a corresponding F-Track channel for disposing the single quick release car. The configuration of these adapters is such that when the adapter is attached to the structure and the single quick release car is positioned correctly in the adapter, the stepped quick release bolt will align with the original installation hole, thus allowing the single quick release cars to be used without modifying the installation. An optional set screw can be disposed in one end of the adapter to hold the single quick release car in place once it is inserted and properly aligned.

Alternately the single quick release car can be adapted to attach directly to a structure with male or female hardware by replacing the male F-Track channel with a mounting hole and using regular nuts or wing nuts (male hardware) or sidewalk bolts (female hardware). In this adaptation, the single quick release car will be a hybrid of the single quick release car and the adapters disclosed above, and is also similar to the quick release track with a single set of first and second holes discussed above. This hybrid adaptation of the single quick release car for direct mount systems may be well suited to new installations, however might require modification of existing installations and thus is not preferred for use with such existing installations. For example, if in existing installations the existing hardware is used to attached the hybrid single quick release cars, the stepped quick release bolts will no longer line up with the holes in the panels. This means either the panels will have to be modified with new holes, or the installation hardware will have to be relocated on the structure so the stepped quick release bolts are aligned in the correct position for the panels. In new installations this can be done at the outset, but in existing installations the adapters discussed above are preferred.

While the use of adapters is preferred in existing direct mount installations, installing a section F-Track in the location where panels are to be attached in the single quick release cars also accomplishes the purpose as does installing a section of quick release track. This is especially suitable in new installations where the positioning of the hardware can be planned in advance and done without modification to existing installations. But in existing installations, retrofitting with F-Track or the quick release track of the present invention causes alignment problems similar to that encountered with the direct attachment of the hybrid single quick release car. If the F-Track or quick release track is installed in existing hardware, then the stepped quick release bolts will not line up with the existing holes in the panels, and a new set of mounting holes must be drilled into the panels. One solution is to remove or cut any male hardware at the surface of the structure (not required for female hardware that is flush to or below the surface of the structure), and to install the F-Track or quick release track in new holes at a position such that the stepped quick release bolts will align with the original hardware. Alternatively, the track at the other end of the opening can be relocated so the originals panel holes line up with the new position of the stepped quick release bolts. In summary, installing quick release track or F-Track in existing direct mount installations for use with the present invention instead of using adapters, although possible, is not preferred unless it is desired to avoid the use of adapters for one reason or another.

In the preferred embodiment, the stepped quick release bolt assembly, the prototypes have been constructed and tested as follows:

A first end length of 0.545" and a diameter of 0.375". This length and diameter provide allow the pin hole to be placed at a point leaving ample metal around the bolt hole to support the forces that might be exerted on the bolt at the point of the pin hole. The length also provides the minimal space needed for the shoulder to protrude beyond the surface of the quick release track or single quick release car.

The middle portion of the bolt is 0.050" in length and has a diameter of 0.292".

A fender washer with an outside diameter of 1.5", an inside diameter of 0.292", and a thickness of ranging from approximately 0.050" to 0.080" is pressed on to the middle portion of the stepped quick release bolt.

The second end of the stepped quick release bolt is approximately 1" long and is disposed with a ¼-20 thread.

The diameter of the first bolt holes in the quick release track or single quick release car is 0.386".

A 0.187" inch diameter quick release pin is utilized.

The diameter of the second pin hole in the stepped quick release bolt and in the quick release track and the single quick release car is 0.193".

The quick release track is 26 inches long, 1.5 inches in height and 0.5" thick. It and has a series of five first bolt and second pin holes, which in the preferred embodiment start at one inch from one end on-center and are placed at six inch intervals on-center, the holes covering a space of 24" with an additional 1" at each end. In the preferred embodiment, the track is not supplied with mounting holes, that being left to the installer so the track can be adapted to both new and existing installations.

The single quick release cars are 2.75" long, and the bolt and pin holes are in the center of this length. The back of the single quick release car is disposed with a male F-Track channel corresponding to the female channel in standard F-Track commonly available on the market.

The female adapter is also 2.75 inch long and is designed for use with female direct mount hardware such as female Panelmates, Sammys and machine screw anchors. The center has a hole to accommodate a standard ¼-20 sidewalk bolt, and has a countersink at the point of the hole so that the head of a standard sidewalk bolt is recessed when installed. Ideally, this hole is not much larger than the diameter of the sidewalk bolt, which serves to keep the single quick release car and the stepped quick release bolt aligned with the original hardware. The two ends have a female F-Track channel to accommodate the male F-Track channel in the car. The single quick release car can thus be placed in the adapter and the position of the stepped quick release bolt will be aligned with the position of the existing direct mount hardware allowing the panel(s) to be installed using existing mounting holes on the panel. An optional set screw can be disposed at one end of the adapter perpendicular to the female channel, and if used this set screw serves to maintain the position of the single quick release car in the female adapter, keeping the stepped quick release bolt aligned during installation.

The male adapter is also 2.75 inch long and is designed for use with male direct mount hardware such as female male Panelmates and other types of studs. The center has a hole of sufficient diameter to accommodate a standard ¼-20 bolt, and a countersink on the back side (the side adjacent to the structure) to accommodate the head of a stud which may be on some studs for installation purposes. Ideally, this hole is not much larger than the stud which serves to keep the single quick release car and the stepped quick release bolt aligned with the original hardware. The width of the center of the male adapter sufficient to accommodate a wing nut such that the wing nut can be turned freely in the center of the adapter, and the depth is sufficient so that the wing nut will not interfere with the installation of the single quick release car into the track on both ends. The two ends of the adapter have a female F-Track channel to accommodate the male F-Track channel in the single quick release car. The single quick release car can thus be placed in the adapter and the position of the stepped quick release bolt will be aligned with the position of the existing direct mount hardware allowing the panel(s) to be installed using existing mounting holes on the panel. An optional set screw can be disposed at one end of the adapter perpendicular to the female channel, and if used this set screw serves to maintain the position of the single quick release car in the female adapter, keeping the stepped quick release bolt aligned during installation.

In use of the preferred embodiment, hurricane panels (the second object) are attached to a structure (the first object) using the quick release track or quick release cars, which are either attached to the structure directly by way of track or adapters. The first ends of the stepped quick release bolts are disposed in the quick release track or quick release cars in their respective first holes and connected with pins passed through the cross-bored hole in the first end of the quick release bolts and the cross-bored second hole in the quick release track or cars, thus the quick release bolts become attached to the structure. A portion of the first end of the stepped quick release bolt protrudes beyond the surface of the quick release track or single quick release car providing a shoulder to support the washer, panel and the force of the fastener used to secure the panel in place. The at least one hurricane panel is placed over the opening with the mounting holes in the panels being placed over the stepped quick release bolts are attached to the structure using the stepped quick release bolt assemblies and are held securely in place. The pins are disposed on the inside side of the panels where they are accessible from inside the structure. Although each pin can be extracted individually and manually by hand, in the preferred embodiment, multiple pins are connected to an extraction mechanism. When the pins are extracted the respective stepped quick release bolts are released from the assembly and thus releasing the corresponding attachment point(s) of the respective panel allowing it to be removed and thereby granting egress through the corresponding opening.

While the preferred embodiment discussed herein is for use with hurricane panels, it should be noted that the present invention can be used to attach and quick release any corresponding second object to and from a first object.

Finally, After development of the present invention a number of prototypes were built to test the hypothesis that the stepped quick release bolt assembly and pin mounted in either single quick release cars or quick release track would not bind in the event of an object strike to a panel in the vicinity of an attachment point, and in the event of a direct strike to the exposed portion of the stepped quick release bolt assembly 1.

The testing assembly comprised two panels 50 approximately seven feet long. The two panels were mounted at two ends using quick release track at one end and single quick release cars at the other end.

At the end mounted with single quick release cars, a section of F-Track sized to accommodate five attachment points corresponding to two panels was attached to a 2"×4" section of wood also approximately 26" in length, and five single quick release cars were disposed in the F-Track.

At the end mounted with quick release track, a quick release track with five attachment points corresponding to two panels was attached to an approximately 2"×4" section of wood approximately 26" in length.

At both ends, the 2"×4" sections of wood were attached to the concrete blocks using sidewalk bolts threaded into machine screw anchors which were embedded into the concrete blocks.

Two strikes of a sledge hammer wheedled by a construction worker were used in the test. The first strike was to the panel at the end mounted with the single quick release cars disposed in F-Track. The strike was delivered to the inside panel (the one with the least support) at approximately a 90 degree angle about two feet from the attachment point, and this strike was intended to simulate an object strike to the inside panel in the vicinity of the attachment point.

For clarification purposes, when multiple panels are installed, each panel overlaps at one attachment point. One panel, referred to as the inside panel, at this overlapping point goes on the inside side of the structure and the other panel is placed over it on the outside side of the structure. Thus, the outside panel has the support of the inside panel and this point of overlapping provides additional strength if an object strikes at the point where the two panels overlap. So the portion of the inside panel not covered by the outside panel is the weakest point in the assembly, and the strike to the inside panel was delivered at this weakest point to maximize the damage to the panel.

The second strike was delivered to one of the exposed ends of the stepped quick release bolt assembly mounted in the quick release track. The stepped quick release bolt was struck at approximately a 45 degree angle from the top down to simulate an object coming down on the assembly and striking the attachment point closest to the ground.

After the test, a handle was used to extract the pins, and all the pins on both ends extracted with minimal difficulty.

At the end that was attached with quick release cars, none of the components of the invention received damage, and all were intact and reusable.

At the end that was attached with the quick release track, the only component of the invention to receive damage was quick release bolt assembly that received a direct strike. Despite the distortion to the exposed end of the stepped quick release bolt, the fender washer, the wing nut and the panel, the first end of the stepped quick release bolt, the hole in the quick release track, the pin and the quick release track itself were not damaged or distorted, and all the pins at this end, including the pin engaging the stepped quick release bolt that was struck disengaged and were easily extracted.

None of the adjacent stepped quick release bolt assemblies were damaged. The only damaged components were the stepped quick release bolt assembly that was struck, and the panel that was attached at the point where the strike occurred. These were damaged beyond repair and that this portion of the panel had to be cut out in order to save the damage components.

It should also be noted that in this test one of the machine screw anchors attaching the 2"×4" block of wood at the end with the quick release track failed. This demonstrates that other points of hardware in hurricane panel installation systems have tolerances lesser than the components of the present invention, and that the tolerances of the components of the present invention likely meet or exceed the tolerances of at least some of the other components in the installation hardware for hurricane panels.

A second embodiment discloses a system and method for attaching and releasing hurricane panels using a series of dual car assemblies, one at each attachment point of the panels being attached for quick release. These dual car assemblies are referred to as "quick cars." There are two configurations of quick cars. In a first configuration, the hard car and soft car are disposed side-by-side, and are referred to as the "dual side-by-side quick release car assembly." In a second configuration, the soft car is disposed over the hard car and is referred to as a "dual stacked quick release car assembly."

Moving on, the second embodiment of the present invention employs a system and method of dual cars for attaching and quick releasing a second object to a first object in general, and in particular for attaching and quick releasing hurricane panels to and from a structure. As with the first embodiment, variation\ns of this second embodiment can be used with most existing installations of hurricane panels and hardware. This second embodiment and its variations as discussed in detail below and shown in the accompanying figures are meant to show the versatility of this dual quick release car system and method and are not intended to be limiting. Various modifications will become obvious to persons skilled in the art.

These side-by-side two car systems are the preferred dual car system when the installation requires minimum build out beyond the front surface of the F-Track channel or structure. In installations where build out from the track is not an issue, it may be preferable to use a stacked car system where the soft car fits over the protruding section of the hard car which is disposed in the F-Track channel. Alternate dual car embodiments for use with F-Track installations comprise a dual stacked car system, where the hard car fits in the F-Track channel, and the soft car fits over the hard car. The hard car and soft care are attached with a pin, and the soft car can accommodate various means of attaching the panels.

The preferred embodiment of this dual quick release car system and method comprises a configuration of side-by-side cars is used in conjunction with F-Track. In this embodiment, the hard car is designed to slide in an F-Track channel and is retained in the F-Track in a manner similar to a track bolt. If desired, at least a portion of the hard car which makes contact with the inside of the F-Track channel can have a serrated surface to inhibit sliding of the hard car inside the F-Track channel when panels are secured. The soft car is adapted to mate with the hard car and is attached to the hard car by a pin. A bolt disposed in the soft car is used to attach the panel to the soft car. When the pin is extracted, the soft car separates from the hard car and the panel is released.

While the dual side-by-side quick release car assembly is the preferred embodiment for use with F-Track, the side-by-side configuration can also be used with other types of track including studded angle track. These cars can also be used with direct mount male or female hardware systems. In such applications, a hole or slot in the hard car replaces the male track channel, and the hard car rests flush against the structure when attached.

In a second preferred embodiment of the dual quick release car method, the dual stacked cars are adapted for use with direct mount systems (male or female hardware in the structure), or studded angle track. The hard car has a mounting hole for attaching the hard car directly to a structure with the back of the hard car resting flush against the structure when attached. The hard car can be attached to the structure with a wing nut on male hardware or with a sidewalk bolt into female hardware. In the preferred configuration of this embodiment, the mounting hole in the hard car is a stepped hole with the larger end of the stepped hole on the structure side of the hard car, such that the hard car can be placed over male mounting hardware, where a portion of the male mounting hardware is of a larger diameter than the portion of the male member to which the wing nut attaches. Thus the hard car in this configuration can be used with both male and female mounting hardware. In the preferred embodiment, the assembly is disposed such that the assembly fits vertically in the channel of the hurricane panel at the mounting hole, and the pin can be centered perpendicular to the mounting hole. This vertical car assembly can also be used as an "end car assembly" to transition between a soft panel and a hard panel, and when so used is placed between the hard panel and the soft panel.

It should be noted that if the dual quick release car method is used, either all the panels at an opening must be soft panels; or an end car assembly comprising the vertically disposed dual stacked quick release car assembly must be used at the transition point between the soft panel or series of soft panels and the hard panel. Without this transition, the attachment point of the soft panel, where it connects with the adjacent hard panel, would remain mounted to the structure, thereby preventing full release of the soft panel(s). The end car creates a transition allowing the hard panel to remain attached and the soft panel to separate from the hard panel. When the direct mount, vertically stacked, dual quick release car assembly is used as an end car, the hard panel must be installed first, and the hard car of the end car assembly placed over the hard panel so that both the hard car and hard panel are secured in place. The end car creates space between the hard panel and the soft panel to allow room for the pin to be extracted. Once the soft car is connected to the hard car with the pin, the soft panel can be attached to the assembly. When the pin is extracted, the soft car and panel are released, while the hard car and hard panel remain in place.

Alternate embodiments of the dual stacked quick release car method are adapted for use with F-Track by replacing the mounting hole style hard car with a male channel style hard car, as in the first preferred embodiment.

When used with F-Track, the soft car can have various configurations of this alternate embodiment for retaining the bolt used to attach the panel, including a U-Channel/knurled bolt combination, a track channel (which slides within the channel in an F-Track), and a track-bolt slot/track bolt, all of which are disclosed. The variations disclosed are not intended to be limiting, but rather to demonstrate that there are many possible configurations and adaptations of this method. Of these variations, the preferred is the U-Channel/knurled bolt combination.

Although each pin can be extracted individually, or the extraction mechanism can be simply a ring, lanyard, hook, carabineer or a combination thereof connected to one or more pins, it is desirable and functional to employ an extraction mechanism for removing multiple pins in a single action. In its preferred embodiment, the extraction mechanism must have a number of attributes as indicated below:

It must be sturdy and capable of delivering sufficient force in excess of what is needed to extract the pins from the assemblies of the invention.

It must deliver a relatively even application of extraction force across multiple pins.

It must be light weight and ergonomic.

It must be easy to package, ship and store without taking up excessive space.

It must be easily adaptable to varying numbers of pins and panels.

It must accommodate different types of hardware for connecting the pins to it, including but not limited to rings, lanyards, carabineers, clips, hooks, chain or a combination of one or more thereof.

It must be able to extract multiple pins in a single actuation.

The form of the preferred embodiment of the extraction mechanism presented herein meets all of the above criteria, although the extraction mechanism could take many different forms to deliver the same effect, and thus this discussion is not intended to be limiting.

The preferred embodiment comprised of an oval opening at one end which serves as a handle for grasping. The second end opposite the handle is reinforced with a member that has connection points for connecting to multiple pins, which in the preferred embodiment is three. The main body of the handle is constructed of polyethylene or a similar material, and the metal reinforcement member, in this case constructed of aluminum, provides strength at the point where the connections to the pins are made. Although the preferred embodiment comprises a handle shaped as an oval, many variations are possible. For example, a "T" shaped handle could provide the same or similar grasping function.

The reinforcement member in the preferred embodiment is attached to the extraction mechanism by machine screws, although it could be connected by rivets, nuts and bolts, or the two pieces could mate together with corresponding channels, much like the way some of the components of the invention, such as the cars for example, mate with F-Track.

Alternately, the extraction mechanism can be constructed so the connections to the pins are made directly to the second end without the reinforcement member. In such an alternate embodiment, it might then be preferable to construct the extraction mechanism entirely of metal or another strong substance that does not need reinforcement.

In the preferred embodiment, the connection points in the extraction mechanism are holes and each hole that comprises a connection point is connected to one pin at each by at least one of a ring and a lanyard or both. Although this is the preferred means for connecting, the connection points could comprise hooks or eye loops for example, and could connect to rings, hooks and eye loops on the pins. Alternatively the pins could be threaded and connected directly to corresponding thread on the extraction mechanism or reinforcement arm. There are many possibilities; however, the object is to connect the pins to be extracted to the extraction mechanism.

Although more than one pin can be connected to each connection point in the extraction mechanism, in the preferred embodiment, each connection point is connected to only one pin. The extraction mechanism and reinforcement arm of the preferred embodiment connects to three pins, one at each end and one in the middle. If more than one panel and three pins are required, extension members which mate with the extraction mechanism or reinforcement member can be added to each end to extend the number of pin connections.

In the preferred embodiment, the extension member mates with the extraction mechanism at either end of the reinforcement arm, is held in by the same machine screw that connects the reinforcement arm to the extraction mechanism, and has two connection points for the pins, one that corresponds to the connection point at the end of the reinforcement arm in which it mates, and a second connection point at the other end which serves as the additional connection. In the preferred embodiment, the end of the extension member opposite the end where it mates with the reinforcement arm is identical in configuration to the end of the reinforcement arm, thus enabling the extension\n member to be mated with another extension member like itself. Therefore, an extraction mechanism with two extension members (one on each end) will connect to five pins (two panels) and an extraction mechanism with for extension member (two on each end) will connect to seven pins (three panels). Although more extensions can be used with more than three panels, beyond three panels it is preferred to use multiple extraction mechanisms.

When in use, the preferred embodiment of the extraction mechanism has a minimal profile. It can be connected to the inboard side of a panel with Velcro or other type of hook and loop fastener. It can also be connected to the inboard side of the panel by other means, or just rested against the panel. The object is for the extraction mechanism to be readily accessible, yet not interfere with the function of the door or window at the opening where it is located.

The foregoing description of the preferred extraction mechanism is not intended to be limiting, but rather to give an overview of the preferred embodiment and some of the possible variations and alternate embodiments.

In all embodiments, the preferred use of the invention is with installations that utilize a track on the bottom, and H-Header or U-Channel track (or similar) at the top, or build out variations of these track types, at the top or on one side of an opening, and another conventional method of attachment at the bottom or on the other side. In such installations the invention is used to attach panels slated for quick release in the opposite the opening. This preferred use has the same advantages of using these tracks in conventional installations in that it requires fewer parts, less time to install and simplifies the overall installation and removal process of the panels being attached with the invention. However, if H-Header or U-Channel track is not installed at one end of an opening, the various embodiments of the invention can be used to secure and release panels on track at both ends of an opening. Likewise, alternate embodiments and variations can be used with direct mount system utilizing male and/or female mounting hardware.

The first embodiment provides for a stepped quick release bolt assembly utilizing a three-stepped bolt, and a quick release track or series of single quick release cars. The stepped quick release bolt is retained in the quick release track or single car with a pin at one end, and has a shoulder that protrudes beyond the surface of the quick release track or the quick car. A middle portion is disposed with a washer or fender washer to provide support for the panel. The panel is secured to the second end with a nut or wing nut. This stepped quick release bolt assembly is adapted for use with most hurricane panel installation methods.

A second embodiment discloses preferred and alternate embodiments of a variety of dual quick release cars for attaching and releasing panels to either track or direct mount systems. In the preferred embodiment of this second embodiment, referred to as a dual side-by-side quick release car assembly, a first hard car is adapted to fit in the channel of an F-Track such that the car can move within the channel and is captured by the channel by a male track extrusion. A second soft car attaches to the hard car with a pin, and the panel is attached to the soft car by a bolt and wing-nut. This car embodiment and its alternates do not require the modification of the F-Track as in the first embodiment, and are useful in installations and applications where it is not feasible or desirable to drill holes in or otherwise modify the F-Track as in the first embodiment.

The use of each embodiment and variations thereof will become clear in the detailed description of the invention and drawings to follow.

BRIEF DESCRIPTION OF THE DRAWINGS

FIGS. 1A-1F show the components of the preferred embodiment of the quick release bolt assembly.

FIGS. 2A-2D show a top, front, perspective and side view, respectively, of a the preferred embodiment of a single quick release car adapted for receiving the quick release bolt assembly.

FIGS. 2E-2J show a front, side, bottom, front perspective, bottom perspective and rear view, respectively, of a the preferred embodiment of a single quick release car adapted for receiving the quick release bolt assembly.

FIGS. 2K-2O show a perspective, left, front, right and side view of an alternate embodiment of the single quick release car, being a multiple quick release car with multiple connection points for receiving five quick release bolt assemblies.

FIGS. 3A and 3B show the components of a stepped quick release bolt assembly, single quick release car, F-Track and fastening hardware, in exploded rear and front perspective views.

FIGS. 3C-3E show a detail side view, side view, and detail exploded component view of a single quick release car disposed in an F-Track attached to a structure, wherein the stepped quick release bolt assembly is disposed in the single quick release car and held in place by a pin, with the panel attached to the stepped quick release bolt assembly with a wing nut.

FIG. 3F shows a rear perspective view of an F-Track section.

FIG. 4A shows the preferred embodiment of a quick release track adapted to be attached to a first object and to accept five sets of quick release bolt assemblies, in this case corresponding to the attachment points of two hurricane panels.

FIG. 4B shows a variation of a quick release track adapted to accept a single quick release bolt assembly corresponding to a single attachment point for a second object such as a hurricane panel.

FIGS. 5A and 5B illustrate a front view and front perspective view of the preferred embodiment of a direct mount male hardware adapter of the present invention.

FIGS. 5C and 5D depicts examples of two types of hurricane panel industry standard male installation hardware.

FIGS. 5E-5G show a perspective side view, side view and exploded side view of one connection point of a hurricane panel attached to direct mount male hardware with the direct mount male hardware adapter, single quick release car and stepped quick release bolt assembly.

FIGS. 6A and 6E show a side exploded view and perspective view of the preferred embodiment of a direct mount female hardware adapter of the present invention.

FIGS. 6B-6D show examples of three types of hurricane panel industry standard female installation hardware.

FIG. 6F-6H show a side perspective, side view and exploded side view of one connection point of a hurricane panel attached to direct mount female hardware with the direct mount female hardware adapter, single quick release car and stepped quick release bolt assembly.

FIGS. 6I-6N show a front, top, side, bottom, bottom perspective and rear view, respectively, of the direct mount female hardware adapter of FIG. 6A.

FIGS. 7A-7C show an exploded top view, detail perspective view, and partially assembled side perspective exploded view of the components of the preferred embodiment of a dual stacked quick release car assembly.

FIGS. 7H-7N show a front, top, side, bottom, top perspective, bottom perspective, and rear view of the hard car of the preferred embodiment of the dual stacked quick release car assembly.

FIGS. 7U and 7V show an exploded and assembled view, respectively, of an alternate embodiment of a dual stacked quick release car assembly with a slotted hard car to allow the position of the soft car and bolt to be adjusted to correspond with the attachment point for the second object.

FIGS. 7W-7AA show a front, side, bottom, bottom perspective, and top perspective view, respectively, of the hard car 111 of an alternate embodiment of the dual stacked quick release car assembly.

FIGS. 7BB-7FF show a front, side, bottom, top perspective, and bottom perspective view, respectively, of the soft car 112 of an alternate embodiment of the dual stacked quick release car assembly.

FIGS. 8A-8D show an exploded rear view, exploded front view, and partially assembled front view, and partially assembled rear view, respectively, of the components the preferred embodiment of a dual side-by-side quick release car assembly designed for use with industry standard F-Track.

FIGS. 8E-8G show a side view, exploded detail side view, and top view of the components of the preferred embodiment of a dual side-by-side quick release car assembly, in the appropriate installation 8F, in which the left side of FIG. 8E shows a view of a hurricane panel attached to an F-Track using a dual side-by-side quick release car assembly. FIGS. 8H-8L show a front, side, top, side perspective and top perspective view, respectively, of the hard car of the preferred embodiment of the dual side-by-side quick release car assembly of FIG. 8A.

FIG. 9A shows the preferred embodiment of an extraction mechanism and its various components, being a handle, a reinforcement member adapted to be attached to the handle with machine screws, and optional extension members.

FIG. 9B shows a detail view of the optional extension members.

FIGS. 9C and 9D are front and side views, respectively, of the handle portion of the preferred embodiment of the extraction mechanism of FIG. 9A.

FIGS. 9E and 9F are side and front views, respectively, of the reinforcement member of the preferred embodiment of the extraction mechanism of FIG. 9A.

FIGS. 9G and 9H are side and front views, respectively, of the optional extension member of the preferred embodiment of the extraction mechanism of FIG. 9A.

DETAILED DESCRIPTION OF THE DRAWINGS

Figure 1I:
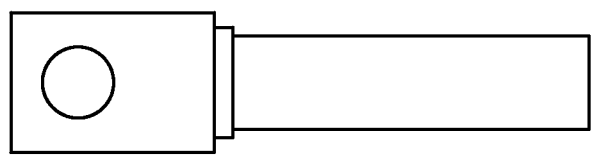
FIGS. 1G-1I show a perspective, top and side view, respectively, of the preferred embodiment of the quick release bolt of FIG. 1A (without threading indicated).

The present invention has two embodiments, both of which are systems and methods designed to enable a second object to be attached to a first object and to enable the second object to be quickly released and disconnected from the first object. In general, the present invention can be used to attach and quick release any second object from any first object. In particular, the preferred embodiments of the present invention are intended for use with existing industry standard installations of hurricane panels and the corresponding industry standard hardware. The components of the present invention are designed for adapting such industry standard installations to allow the hurricane panels to be securely attached to a structure without modifications to the structure, the hurricane panels or to any industry standard hardware components, and in a manner that enables the hurricane panels attached with the present invention to be quickly released and removed from within the structure to which they are attached, thus facilitating egress from the structure through the opening from which the hurricane panels are so removed.

The first embodiment is a system and method comprising quick release bolt assembly used in conjunction with a quick release track and a single quick release car, the latter of which, depending on the type of installation method, may utilize certain direct mount male hardware adapters or direct mount female hardware adapters, also of the present invention. The second embodiment comprises a system and method of dual quick release cars which in various embodiments may be in a stacked or side-by-side configuration.

Starting our discussion with the first embodiment of the present invention which provides for a system and method of using a combination of a stepped quick release bolt assembly disposed in a quick release track or a single quick release car, the quick release bolt assembly being held in place to either by a pin. The quick release track is attached directly to a first object (such as a structure), and the single quick release car can be attached directly to a first object, to a track attached to the first object, or to an adapter (for use with industry standard male or female hardware) also attached to a first object. In general, the quick release bolt assembly when inserted into the quick release track or single quick release car is designed to have a shoulder to provide space and support to take up the tensioning force when a second object is fastened to the stepped quick release bolt assembly.

The preferred embodiment of the stepped quick release bolt assembly uses a three stepped bolt. The first end has the largest diameter and has a cross-bored hole positioned and sized to accept a pin. A middle portion has a diameter less than the diameter of the first end and greater than the diameter of the second end, and is sized and disposed to accept a fender washer which is pressed onto the stepped quick release bolt during assembly. A second end has a diameter less than the middle portion and is disposed with thread to accept a fastener such as a nut or a wing nut. The first end and pin hole are sized and disposed so that when the stepped quick release bolt is connected to a single quick release car with the pin, a portion of the first end protrudes from the forward surface of a single quick release car creating a shoulder to provide space between the forward surface of the quick release track or single quick release car and the fender washer. The fender washer provides support for tensioning of the second object when it is fastened to the stepped quick release bolt assembly. It is this space provided by the shoulder and support surface provided by the fender washer that i) prevent the tensioning force of the fastener from causing the pin to bind in the stepped quick release bolt assembly and quick release track or single quick release car; and ii) prevent distortions caused by a foreign object striking the exposed portion of the stepped quick release bolt assembly or the second object attached thereto from also causing the pin to bind in the stepped quick release bolt assembly and quick release track or single quick release car. Thus, this design is intended to enable the pin to always be easily extracted (even after an object strike) thereby allowing the stepped quick release bolt assembly and the second object attached thereto to be quickly and easily detached from the quick release track or single quick release car, thereby effecting the quick release of the second object from the first object as intended.

In its preferred embodiment, this stepped quick release bolt used in conjunction with the quick release track and/or single quick release car combination are used for attaching hurricane panels (the second object) to a structure (the first object) although this system and method can be used to attach and enable the quick release of any second object to any first object. The preferred embodiment of this first embodiment of the invention and some possible variations are discussed in detail below and shown in the accompanying figures. The preferred and alternate embodiments discussed below and shown in the figures are intended to show the versatility of the system and method of stepped quick release bolt assembly and single quick release car combination, and are not intended to be limiting. In fact, various modifications will become obvious to persons skilled in the art.

FIG. 1A and FIG. 1E show the components of the preferred embodiment of stepped quick release bolt assembly 2. The two components of the preferred embodiment consist of a three stepped quick release bolt 2 and a fender washer 7. The lower left and right views show the stepped quick release bolt assembly 1 as assembled with the fender washer 7 pressed onto the middle portion 4 of the stepped quick release bolt 2.

In the preferred embodiment the stepped quick release bolt 2 is round in shape and has three steps, one step on a first end 3 having the largest diameter, a second step in the middle portion 4 having a smaller diameter than the diameter of the first end, and a third step on a second end 5 having a diameter smaller than the diameter of the middle portion.

The first end 3 has a cross-bored hole 6 sized and disposed to accommodate a pin 15, and the second end 5 has a thread corresponding to the thread on a nut or wing nut (not shown) that is to be used to attach an object (the second object) to the stepped quick release bolt assembly.

The depth of the first end 3 and placement of the pin hole 6 on the quick release bolt 2 are such that when attached to mounting hardware a portion of the first end protrudes beyond the forward surface of the stepped quick release car, thereby providing a shoulder to create space between the forward surface of the single quick release car and the fender washer 7, and to support the fender washer 7 and any tension forces of the fastener when the second object is fastened to the stepped quick release bolt assembly 1.

The middle portion 4 has a diameter less than the first end and a depth corresponding to a fender washer 7. The fender washer 7 has a hole 8 sized to enable the fender washer 7 to be pressed onto the middle portion 4 of the stepped quick release bolt 2 to complete the assembly of the stepped quick release bolt assembly 1.

The third end 5 has a diameter which is less than the diameter of the middle portion, and is disposed with a thread corresponding to the thread on a fastener that is to be used to attach an object (the second object) to the stepped quick release bolt assembly 1.

FIG. 1C shows the preferred embodiment of a pin 15 which is sized to pass through the hole 6 in the first end of the stepped quick release bolt assembly 2. This pin 15 is shown with an optional ring 16 which can be used to connect the pin 15 to an optional extraction mechanism, although the pin 15 can be connected directly to the optional extraction mechanism, or extracted directly without the use of an extraction mechanism.

A number of possible departures from the preferred embodiment of the stepped quick release bolt assembly 1 may be noted at this time.

While a fender washer 7 is used in the preferred embodiment, alternate embodiments may use any type of washer.

The fender washer 7 (or other washer) may be omitted all together and in such alternate embodiments the quick release bolt assembly 1 may be a single component having a middle portion 4 that is larger in diameter than the first end 3 and larger in diameter than the second end 5. Thus the middle end 4 has the largest diameter and provides the same functionality as the preferred embodiment which utilizes the fender washer 7.

In yet other alternate embodiments, the stepped quick release bolt 2 may omit the middle portion 4 and have only two diameters, the first end 3 having the largest diameter, and the second end 5. As in the preferred embodiment, the surface of the first end 3 protrudes beyond the forward surface of the single quick release car and its diameter is sufficient so that the shoulder also becomes the support surface for tensioning the object being attached.

Figure 1G:
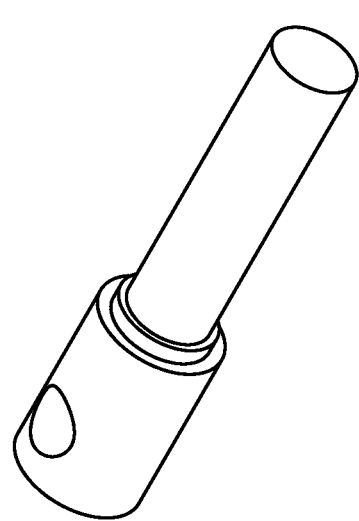
Figure 1H:
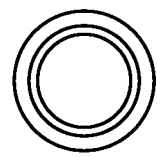

FIGS. 1G-1I show the preferred embodiment of the quick release bolt 2 of FIGS. 1A-1F.

The stepped quick release bolt assembly 1 is designed for use with either a single quick release car or quick release track, either of which are attached to a first object, which in the preferred embodiment is a structure. The stepped quick release bolt, when in use is connected to either of the single quick release car or quick release track by a pin, and the second object, which in the preferred embodiment is a hurricane panel, is fastened to the stepped quick release bolt assembly with a fastener such as a nut or a wing nut. When the pin is extracted, the stepped quick release bolt is released from its attachment thereby releasing the second object from the first object.

The single quick release car is discussed in detail below, followed by a discussion of the quick release track.

FIGS. 2A-2D show the preferred embodiment of the single quick release car 10. In this preferred embodiment, the single quick release car is disposed with a bolt hole 11 sized and positioned to accommodate the stepped quick release bolt of FIGS. 1G-1I. A cross-bored pin hole 12 is sized and disposed to accommodate a pin (not shown) passes through the bolt hole 11. The preferred embodiment of the single quick release car 10 has a male track channel 14 sized and disposed to mate with the female track channel in at least one of an F-Track, a direct mount male hardware adapter, or a direct mount female hardware adapter, the latter two of which are of the present invention and which are illustrated in the figures and discussed in detail below.

It should be noted at this point, that while in this preferred embodiment, the bolt hole 11 passes completely through the axis of the single quick release car 10, the depth of the bolt hole 11 could correspond to the first end of the stepped quick release bolt assembly such that the maximum depth to which the stepped quick release bolt assembly can be inserted into the bolt hole 11 corresponds to the proper alignment of the pin. This is shown and discussed in more detail under FIG. 10A.

In an alternate embodiment, the single quick release car can be disposed with one or more mounting holes (not shown) to enable it to be attached directly to a first object (a structure), and this alternate embodiment may retain or omit the channel 14. When this single quick release car is adapted to be attached directly to a structure, it emulates the functionality of the single quick release track as shown and discussed under FIG. 4B.

FIGS. 2E-2J show the preferred embodiment of the single quick release track of FIGS. 2A-2D.

Figure 2K:
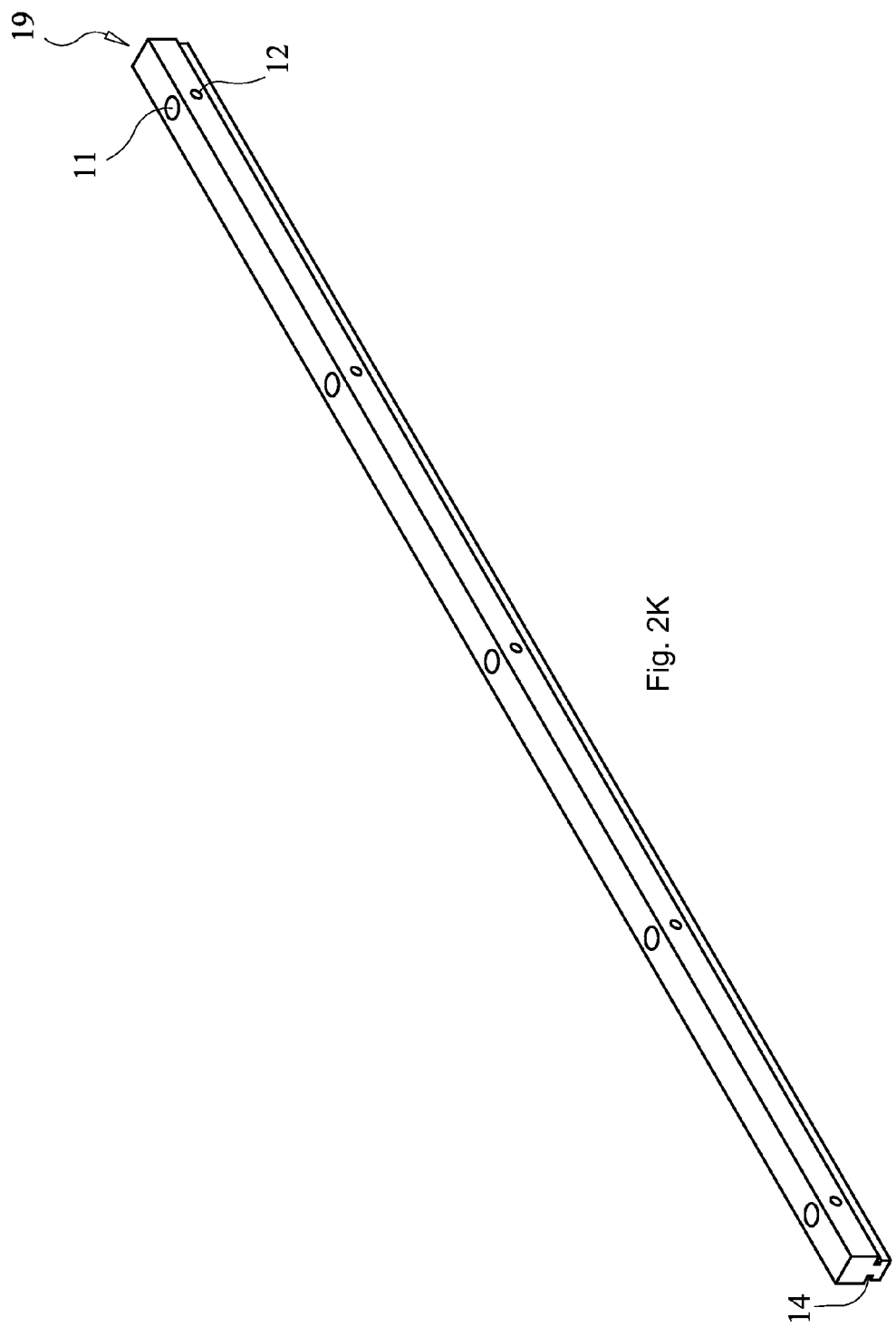

FIG. 2K shows an alternate embodiment of the single quick release car, being a multiple quick release car 19 with bolt hole 11 and pin hole 12 combinations providing multiple connection points for receiving multiple quick release bolt assemblies. As with the preferred embodiment of the single quick release car of FIGS. 2A-2D, this multiple quick release car 19 has a channel 14. This particular alternate embodiment is designed for use with F-Track already attached to a structure (the first object) and has five attachment points (bolt hole 11 and pin hole 12 combinations) corresponding to two hurricane panels (the second object).

FIGS. 2L-2O show the alternate embodiment of a multiple quick release car of FIG. 2K. FIGS. 3A and 3B shows two views of a stepped quick release bolt assembly 1, a single quick release car 10 and an F-Track 51 as they relate to each other prior to assembly. Also shown are the pin 15 with the optional ring 16 attached, a fastener 38, in this case a wing nut, and an optional washer 39. Note that the F-Track 51 has a channel 52 for receiving the single quick release car 10 and a mounting hole 53 for attaching the F-Track 51 to a structure.

FIGS. 3C-3E show a single quick release car 10 disposed in an F-Track 51 attached to a structure 55. The stepped quick release bolt assembly 1 is disposed in the single quick release car 10 and held in place by a pin 15, with an optional ring 16 connected thereto. The panel 50 is fastened to the stepped quick release bolt assembly 1 with a wing nut 38. An optional washer is disposed between the wing nut 38 and the panel 50. In use, the entire assembly holds the panel 50 securely to the structure 55. When the pin 15 is extracted, the stepped quick release bolt assembly 1 and the attached panel 50 are released from the quick release car 10 for removal, with the stepped quick release bolt assembly 1 remaining attached to the panel 50. The optional ring 16 can be used to connect the pin 15 to an optional extraction mechanism (not shown), although the pin can be extracted by any another device or can be extracted manually.

FIG. 3C shows the various components as discussed above as they relate to each other prior to assembly.

The circled portion of FIG. 3D is detailed in FIG. 3B, being an enlarged view of the panel 50 attached to the stepped quick release bolt assembly 1 disposed in a single quick release car disposed 10 which is disposed in the F-Track 51 attached to the structure 55. This enlarged view illustrates how the depth of the first end of the stepped quick release bolt assembly 1 extends beyond the forward surface of the single quick release car 10 creating a shoulder to support the fender washer 7 of the stepped quick release bolt assembly 1, and leaving a space between the fender washer 7 and the forward surface of the single quick release car 10.

This shoulder and space left allow the fender washer 7 to absorb the tensioning force created when the panel 50 is fastened to the stepped quick release bolt assembly 1, by the wing nut 38, thereby preventing the tensioning from applying any forces on the stepped quick release bolt assembly 1 and pin 15 that would cause the pin 15 to bind were the panel 50 be tensioned directly against the forward surface of the single quick release car.

The space, shoulder and fender washer 7 also prevent the assembly from exerting binding forces on the stepped quick release bolt assembly 1 and pin 15 in the event an object strikes the exposed portion of the stepped quick release bolt assembly 1 directly or strikes the panel 50 in the vicinity of the fastening point. When a force bends a metal, the metal will flex back from its maximum degree of bend. So, in the event of such a strike, any distortion of the fender washer 7 will be minimal and will be arrested by the forward surface of the single quick release car 10. The fender washer 7 will then flex back slightly from its maximum distortion, leaving some space intact between the fender washer 7 and the forward surface of the single quick release car 10, and relieving the binding forces exerted on the stepped quick release bolt assembly 1 and pin 15 by the strike. Thus, even after a direct strike on the exposed portion of the stepped quick release bolt assembly 1, there will remain some space between the fender washer 7 and the forward surface of the single quick release car 10, and there will be minimal or no binding forces on the pin 15 and stepped quick release bolt assembly 1 that would prevent the pin 15 from being extracted.

Figure 3G:
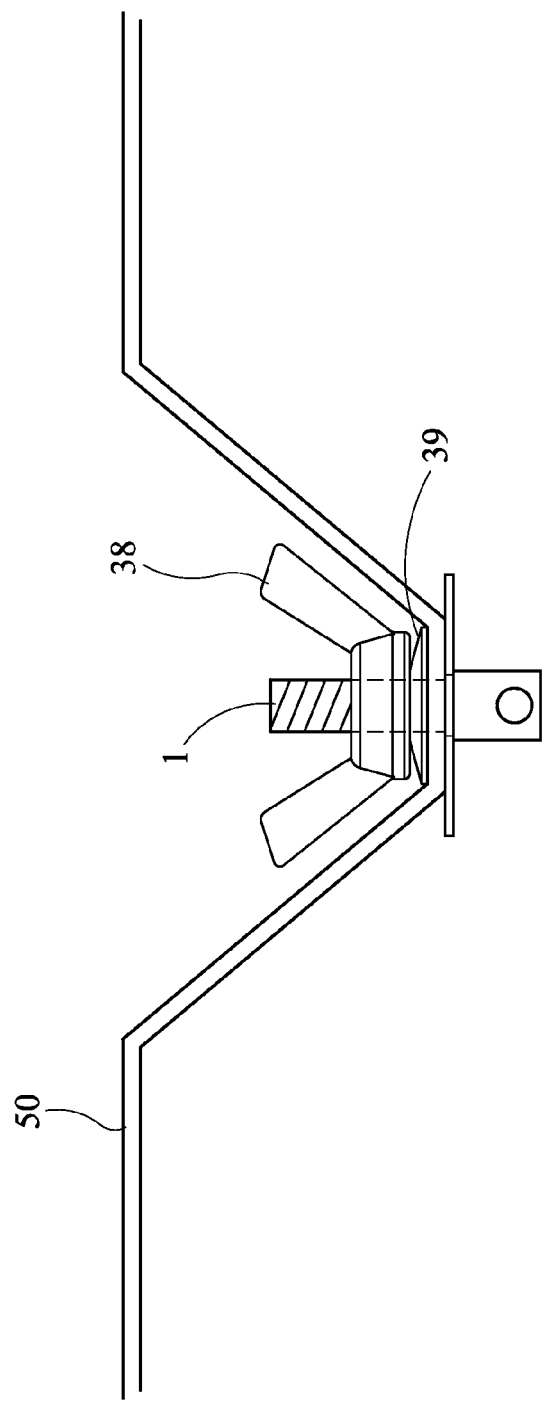
FIG. 3G shows a post release view of a portion of a panel that was attached to a structure with a stepped quick release bolt assembly, in which the pin has been extracted and the panel removed from the structure, and the stepped quick release bolt assembly remains attached to the panel after being released.

FIG. 3G shows a post release view of a portion of a panel 50 that was attached to a structure (not shown) with a stepped quick release bolt assembly 1. A wing nut 38 was used to secure the panel 50 to the stepped quick release bolt assembly 1. Also shown is the optional washer 39 between the wing nut 38 and the panel 50. In this view, the pin(s) (not sown) has been extracted and the panel 50 has been released from its attachment to the structure. After release, the stepped quick release bolt assembly 1 remains attached to the panel 50.

FIG. 4A shows the preferred embodiment of a quick release track 20 adapted to be attached to a first object, which in the preferred embodiment is a structure. The quick release track 20 shown is adapted to receive five sets of stepped quick release bolt assemblies 1 in five separate combinations of bolt holes 21 and corresponding pin holes 22, and has a number of mounting holes 23 for attaching the quick release track 20 to an object such as a structure. Also shown in this FIG. 4A are the components of the stepped quick release bolt assembly 1, pin 15 and optional ring 16 both before (on the right) and after installation (on the left). When used to attach a hurricane panel or other object, once the stepped quick release bolt assembly 1 is connected to the quick release track 20 with the pin 15, the attachment points of the hurricane panel or other object (not shown) are placed over the corresponding stepped quick release bolt assemblies 1 and fastened to the quick release track with corresponding fasteners (not shown). In use, the entire assembly holds the panel 50 securely to the structure 55. When the pin 15 is extracted, the stepped quick release bolt assembly 1 and the attached panel 50 are released from the quick release track 20 for removal, with the stepped quick release bolt assembly 1 remaining attached to the panel 50. The optional ring 16 can be used to connect the pin 15 to an optional extraction mechanism (not shown), although the pin can be extracted by any another device or can be extracted manually.

FIG. 4B shows a single quick release track 24 adapted for a single connection to a single stepped quick release bolt assembly. This single quick release track 24 has one bolt hole 21 and corresponding pin hole 22 and mounting hole 23. This single quick release track 24 corresponds to a single quick release car adapted to be attached directly to a first object such as a structure.

Figure 4C:
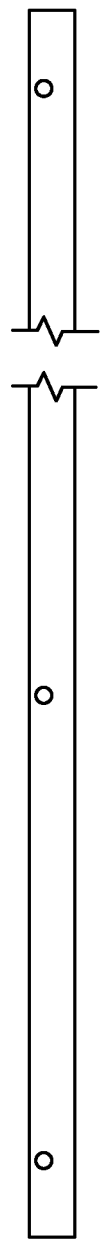
FIGS. 4C and 4D show a side and top view, respectively, of the quick release track of FIG. 4A.
Figure 4D:
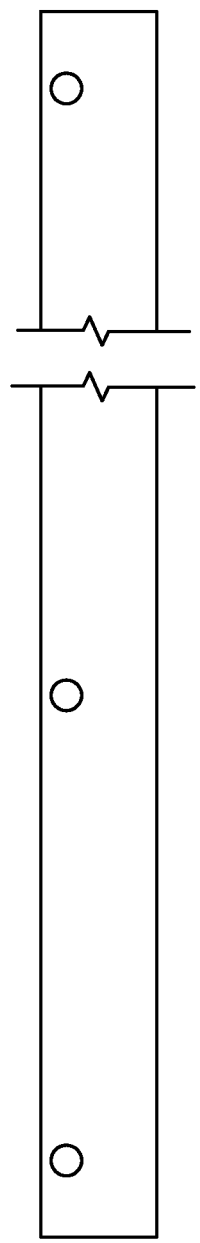

FIGS. 4C and 4D show the quick release track of FIG. 4A.

Some direct mount installations of hurricane panels utilize industry standard male hardware components disposed in the structure. These male hardware components are typically installed in a structure proximate the opening to be covered with a hurricane panel and protrude from the surface of the structure. When the panels are installed, the panels are typically fastened to the structure with industry standard wing nuts threaded over the male hardware components disposed in the structure.

FIGS. 5A and 5B show the preferred embodiment of a direct mount male hardware adapter 30 which is designed for use in connecting the single quick release car of FIG. 2A to industry standard male direct mount hurricane panel installation hardware including but not limited to male Tapcon SG™ anchors 39A and male Panelmate anchors like the male Panelmate 39B shown in FIGS. 5C and 5D.

A stepped mounting hole 33A has two diameters, a diameter at the first end 33B which is the smaller of the two diameters, and a diameter at the second end 33C which is larger than the diameter of the first end 33B. Ideally, the diameter of first end 33B of this stepped mounting hole 33A maintains a minimum tolerance beyond the diameter of the portion of the threaded portion of the male hurricane hardware 39A and 39B which serves to keep the direct mount male hardware adapter 30 correctly aligned, so that when installed, the position of the single quick release car of FIG. 2A and the stepped quick release bolt of FIG. 1A will maintain the same alignment as the male hurricane hardware 39A and 39B which is installed in the structure. The object is to keep the same alignment as the originally installed male hurricane hardware so the panels will fit in place as intended by the installation.

FIGS. 5A and 5B show the adapter disposed to be attached to a first object with male hardware and is adapted to receive a single quick release car and quick release bolt assembly also of the present invention.

The second end 33C of the stepped hole 33A has the larger of the two diameters, and is sized of sufficient diameter to accommodate the installation component of some types of male hurricane hardware such as the particular male Panelmate 39B shown in this FIG. 5D which has a hex nut formation that protrudes from the surface of the structure when the male Panelmate 39B is installed in the structure. The larger diameter of the second end 33C of the stepped mounting hole 33A enables the direct mount male hardware adapter 30 to be installed flush to the structure in installations which utilize male direct mount hardware such as the male Panelmate 39B.

Thus, the stepped mounting hole 33A serves the dual purpose of maintaining proper alignment of the installation, and having a "one size fits all" functionality for mostly all industry standard male direct mount installation hardware.

To either side of the stepped mounting hole 33A is a cavity 32 having a width and depth sufficient to accommodate a fastener 34 (typically a wing nut in hurricane industry standard installations) and to allow the fastener 34 to turn freely within the confines of this cavity 32. Ideally, this fastener 34 is the same type of wing nut that would be used to install the hurricane panel to the direct mount male hardware 39A and 39B. Thus the width of the cavity 32 must be sufficient to accommodate the fastener 34 and allow it to turn freely within the cavity 32; and the depth of this cavity 32 must be sufficient so that when the single quick release car is disposed in the track channel 31 (discussed below) the fastener 34 will not obstruct or interfere with the free movement of the single quick release car through the track channel 31.

The direct mount male hardware adapter 30 is disposed with female track channel 31 on both outboard sides of the cavity 32 surrounding the stepped mounting hole 33A. This female track channel 31 corresponds to the male track channel on preferred embodiment of the single quick release car (not shown). An optional set screw hole 36 disposed on one side of the direct mount male hardware adapter 30 in a position corresponding to the female track channel 31. This optional set screw hole 36 accommodates an optional set screw 35, which if employed is used to hold the single quick release car in place in the direct mount male hardware adapter 30 once installed. When installed over a male hardware component 39A and 39B, the direct mount male hardware adapter is secured to the structure and male hardware component 39A and 39B by a fastener 34 (in this case a wing nut) having a thread corresponding to the thread on the male hardware component 39A and 39B.

FIG. 5G shows the components of the stepped quick release bolt assembly 1, the single quick release car 10, direct mount male hardware adapter 30 prior to installation. A pin 15 with an optional ring 16, a set screw 35, male hardware component 39B, panel 50, wing nut 38 and optional washer 39 are also shown.

FIGS. 5E and 5F show the components of the stepped quick release bolt assembly 1, the single quick release car 10, and the direct mount male hardware adapter 30 prior to installation. Also shown are pin 15 with an optional ring 16, a set screw 35, a male hardware component 39B (in this case a male Panelmate™), a hurricane panel 50, and a wing nut 34 for attaching the male direct mount hardware adapter 30 to the structure 55 VIA the male hardware component 39A and 39B. A wing nut 38 and optional washer 39 for fastening the hurricane panel 50 are also shown.

FIG. 5E is a view of a panel 50 fastened to a structure 55 using a stepped quick release bolt assembly 1 secured to the single quick release car 10 with a pin 15; with the single quick release car 10 being disposed in the direct mount male hardware adapter 30 which is attached to the structure 55 through a male hardware component 39B disposed in the structure 55; the direct mount male hardware adapter 30 being secured to the male hardware component 39B with a wing nut 34. The panel 50 is secured to the stepped quick release bolt assembly 1 with a wing nut 38. An optional washer 39 is disposed between the wing nut 38 and panel 50. In this view, the single quick release car 10 is secured in place in the direct mount male hardware adapter 30 by an optional set screw 35. The pin 15 holds the stepped quick release bolt assembly 1 and the attached panel 50 in the single quick release car 10. In use, the entire assembly holds the panel securely to the structure 55. When the pin 15 is extracted, the stepped quick release bolt assembly 1 and the attached panel 50 are released from the single quick release car 10 for removal, with the stepped quick release bolt assembly 1 remaining attached to the panel 50. The optional ring 16 can be used to connect the pin 15 to an optional extraction mechanism (not shown), although the pin can be extracted by any another device or can be extracted manually.

Figure 5K:
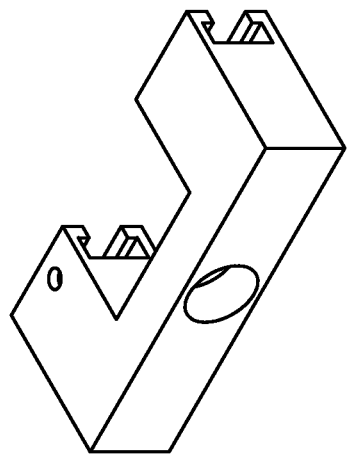
FIGS. 5H-5L show a front, side, top perspective and rear view of the direct mount male hardware adapter of FIG. 5A.
Figure 5L:
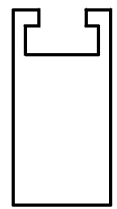
Figure 5I:
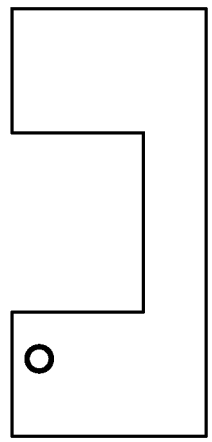
Figure 5J:
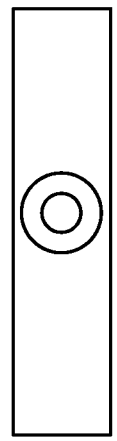
Figure 5H:
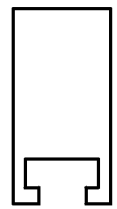

FIGS. 5H-5L show the preferred embodiment of the direct mount male hardware adapter 30 of FIG. 5A.

Finally, it should be noted that direct mount male adapter 30 is a one-size-fits-all solution which is suitable for use with both male and female direct mount hardware. However the direct mount female adapter to be discussed below has the advantage of providing a lower profile and less offset between the structure and the hurricane panels. This is because the depth of the cavity in the direct mount female adapter need only accommodate the head of a sidewalk bolt, and does not need the depth and width required by a wing nut typically used in direct mount installations that utilized male hardware.

Moving on with our discussion of the direct mount female adapter of the present invention, some direct mount installations of hurricane panels utilize industry standard female hardware components disposed in the structure. These female hardware components are typically installed in a structure proximate the opening to be covered with a hurricane panel and do not protrude from the surface of the structure. When the panels are installed, the panels are typically fastened to the structure with industry standard sidewalk bolts threaded into the female hardware components disposed in the structure.

FIGS. 6A and 6E show the preferred embodiment of a direct mount female hardware adapter 40 which is designed for use in connecting the single quick release car of FIG. 2A to examples of three types of hurricane panel industry standard direct mount female hurricane panel installation hardware including but not limited to sidewalk anchors 49A, SAMMYS® 49B and female Panelmates™ 49C, shown in FIGS. 6B-6D.

A mounting hole 43, which ideally has a diameter that maintains a minimum tolerance beyond the diameter of the threaded portion of a typical industry standard sidewalk bolt 48 serves to keep the direct mount female hardware adapter 40 correctly aligned, so that when installed, the position of the single quick release car of FIG. 2A and the stepped quick release bolt of FIG. 1A will maintain the same alignment as the female hurricane hardware 49A, 49B and 49C which is installed in the structure. The object is to keep the same alignment as the originally installed female hurricane hardware so the panels will fit in place as intended by the installation.

To either side of the mounting hole 43 is a cavity 42 having a width and depth sufficient to accommodate a fastener 48 (typically a sidewalk bolt in hurricane industry standard installations) and to allow the fastener 48 to fit within the confines of this cavity 42. Ideally, this fastener 48 is the same type of sidewalk bolt that would be used to install the hurricane panel to the direct mount female hardware 49A, 49B and 59C. Further, the depth of this cavity 42 must be such that the head of the fastener 48 is recessed sufficiently to allow the single quick release car to be disposed in the track channel 41 (discussed below) so that the head of the fastener 48 will not obstruct or interfere with the free movement of the single quick release car through the track channel 41.

The direct mount female hardware adapter 40 is disposed with female track channel 41 on both outboard sides of the cavity 42 surrounding the mounting hole 43. This female track channel 41 corresponds to the male track channel on preferred embodiment of the single quick release car (not shown). An optional set screw hole 46 disposed on one side of the direct mount female hardware adapter 40 in a position corresponding to the female track channel 41. This optional set screw hole 46 accommodates an optional set screw 45, which if employed is used to hold the single quick release car in place in the direct mount male hardware adapter 40 once installed. When attached to a female hardware component 49A, 49B and 49C, the direct mount female hardware adapter is secured to the structure and female hardware component 49A, 49B and 49C by a fastener 48 (in this case a sidewalk bolt) having a thread corresponding to the thread on the female hardware component 49A, 49B and 49C.

FIG. 6H shows the components of the stepped quick release bolt assembly 1, the single quick release car 10, and the direct mount female hardware adapter 40 prior to installation. Also shown are pin 15 with an optional ring 16, a set screw 45, a female hardware component 49B (in this case a SAMMYS®), a hurricane panel 50, and a sidewalk bolt 48 for attaching the female direct mount hardware adapter 40 to the structure 55 VIA the female hardware component 49A, 49B and 49C. A wing nut 38 and optional washer 39 for fastening the hurricane panel 50 are also shown.

FIG. 6F shows a view of the components of the stepped quick release bolt assembly 1, the single quick release car 10, direct mount female hardware adapter 40 as assembled. Note that in this view, the panel 50 is not attached, and the female hardware component 49B is not installed in the structure.

FIG. 6G is a view of a panel 50 fastened to a structure 55 using a stepped quick release bolt assembly 1 secured to the single quick release car 10 with a pin 15; with the single quick release car 10 being disposed in the direct mount female hardware adapter 40 which is attached to the structure 55 through a female hardware component 49B disposed in the structure 55; the direct mount female hardware adapter 40 being secured to the female hardware component 49B with a sidewalk bolt 48. The panel 50 is secured to the stepped quick release bolt assembly 1 with a wing nut 38. An optional washer 39 is disposed between the wing nut 38 and panel 50. In this view, the single quick release car 10 is secured in place in the direct mount female hardware adapter 40 by an optional set screw 45. The pin 15 holds the stepped quick release bolt assembly 1 and the attached panel 50 in the single quick release car 10. In use, the entire assembly holds the panel securely to the structure 55. When the pin 15 is extracted, the stepped quick release bolt assembly 1 and the attached panel 50 are released from the single quick release car 10 for removal, with the stepped quick release bolt assembly 1 remaining attached to the panel 50. The optional ring 16 can be used to connect the pin 15 to an optional extraction mechanism (not shown), although the pin can be extracted by any another device or can be extracted manually.

FIGS. 6I-6N show the preferred embodiment of the direct mount female hardware adapter 40 of FIG. 6A.

Continuing our discussion with the second embodiment of the present invention, which comprises a system and method employing various embodiments of a dual quick release cars, which may be disposed in a stacked or side-by-side configuration.

Figure 7G:
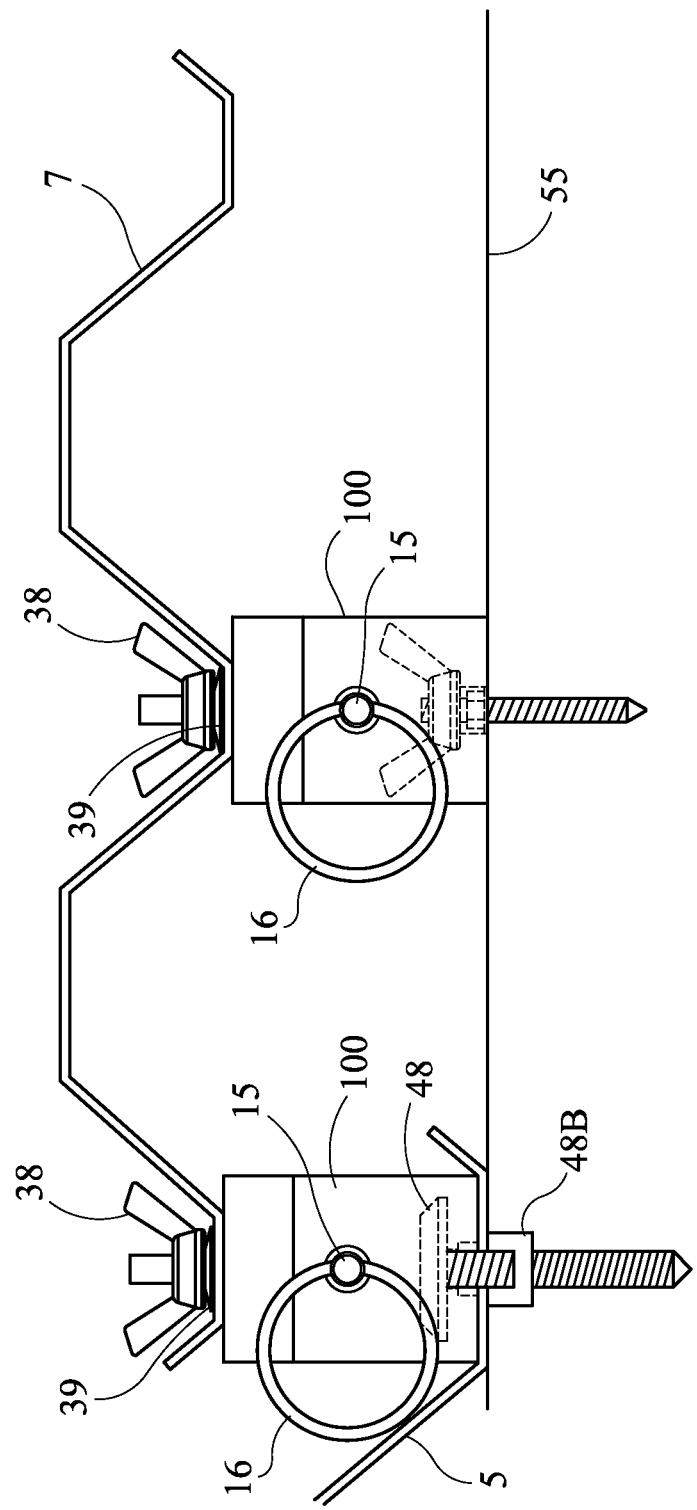
FIG. 7G illustrates how the preferred embodiment of the dual stacked quick release car assembly can be used as an end car to attach and transition between a hard panel and a soft panel.
Figure 7R:
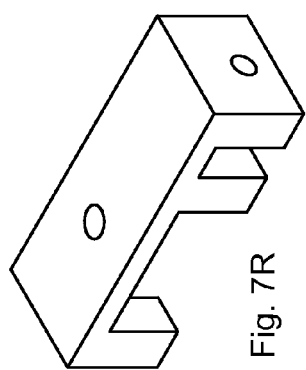
FIGS. 7O-7T show a front, side, bottom, top perspective, bottom perspective and rear view of the soft car of the preferred embodiment of the dual stacked quick release car assembly.
Figure 7S:
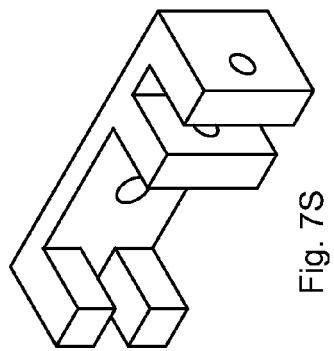
Figure 7T:
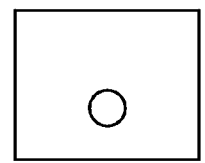
Figure 7P:
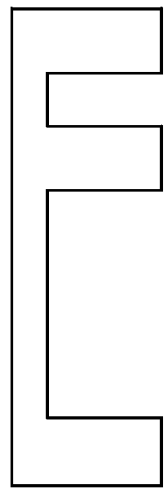
Figure 7Q:
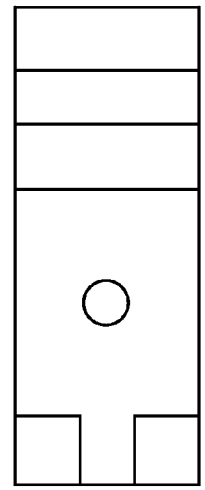
Figure 7O:
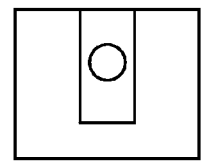
Figure 7E:
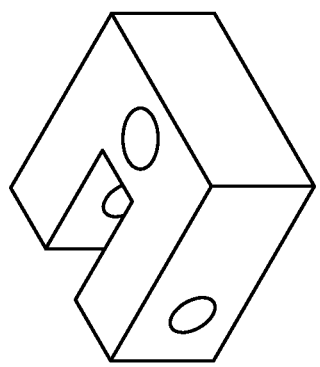
FIGS. 7D and 7E show a side view of an attached and a detached dual stacked quick release car assembly.
Figure 7F:
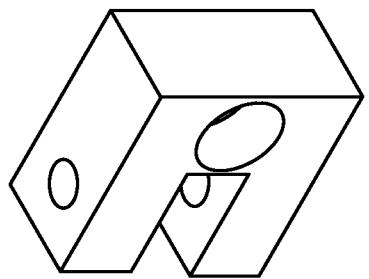
FIG. 7F shows a front view of a panel attached at two points with a dual stacked quick release car assembly.
Figure 7C:
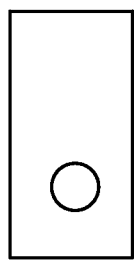
Figure 7D:
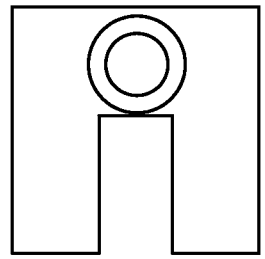
Figure 7B:
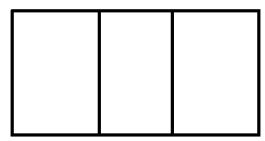

FIGS. 7A-7C show the components of the preferred embodiment of a dual stacked quick release car assembly 100 When used with industry standard hurricane hardware installations, this embodiment of a dual stacked quick release car assembly 100 can be used solely to install and quick release hurricane panels, or to act as and end car to transition between a hard panel and a soft panel such that the hard panel is attached held in place by the dual stacked quick release car assembly 10 and the soft panel is attached for quick release by the same dual stacked quick release car assembly 10.

The dual stacked quick release car assembly 100 of this preferred embodiment comprises a hard car 101A and a soft car 101B, which mate together when assembled, and ideally are designed as a one-size-fits-all configuration so that the system can be used with hurricane industry standard mounting systems including but not limited to F-Track, studded angle track, male direct mount hardware and female direct mount hardware.

The hard car 101A has a stepped mounting hole 102A for attaching the soft car 101A to the structure (first object).

The larger diameter end of the stepped mounting hole 102A is disposed on the side of the soft car 101A that is intended to contact the surface of the structure (first object). Ideally the depth and diameter of the larger diameter end sufficient to the installation component of some types of male hurricane hardware such as the particular male Panelmate 39B which has a hex nut formation that protrudes from the surface of the structure when the male Panelmate 39B is installed in the structure. The larger diameter and appropriate depth of this larger diameter end of the stepped mounting hole 102A enables the soft car 101A to be installed flush to the structure in installations which utilize male direct mount hardware such as the male Panelmate 39B.

The smaller diameter end of the stepped mounting hole 102A is on the side of the soft car 101A that mates with the hard car 101B, and ideally, this smaller diameter end maintains a minimum tolerance beyond the diameter of the portion of the threaded portion of the male hurricane hardware 38B (in this case a male Panelmate™) and female hurricane hardware 48 (in this case a sidewalk bolt), which serves to keep the hard car 101A correctly aligned, so that when installed, the position of the soft car 100B and the knurled bolt 29 installed therein will maintain the same alignment as the hurricane hardware installed in the structure. The object is to keep the same alignment as the originally installed hurricane hardware so the panels will fit in place as intended by the installation.

Thus, the stepped mounting hole 102A in the hard car 101A serves the dual purpose of maintaining proper alignment of the installation, and having a "one size fits all" functionality for mostly all industry standard hurricane panel installation hardware.

Finally, the hard car 101A has at least one pin hole 103A which is sized to accommodate a pin 15 and disposed to correspond with the at least one pin hole in the soft car 101B when the two cars are mated together for attachment.

The soft car 101B is disposed with a hole 102B disposed so that the hole 102B is aligned with the mounting hole 102A on the soft car 101A when the soft car 101B is mated to the hard car 101A. A knurled bolt 29 is used in the preferred embodiment, and this knurled bolt 29 is installed in the soft car 101B so that the threaded end of the knurled bolt 29 is on the outboard side of the soft car 101B, and therefore pointing away from the structure when the soft car 101B is mated to the hard car 101A. Finally, the soft car 101B has at least one pin hole 103B which is sized to accommodate a pin 15 and disposed to correspond with the at least one pin hole in the hard car 101A when the two cars are mated together for attachment.

Further, the construction of the hard car 101A and the soft car 101B must be such as to insure that the two cars are properly aligned when mated, and that when mated a cavity 104 of sufficient depth and width is left between the two pieces 101A and 101B so as to provide adequate space for the fastener 34 or 48 used to attach the hard car 101A to the structure, and for a pin 15 to pass through both pieces 101A and 101B unobstructed by the fastener 34 or 48. Thus the construction of the hard car 101A and the soft car 101B, and size and depth of the cavity 104 between the hard car 101A and soft car 101B further serves the purpose of maintaining proper alignment of the components and of having a "one size fits all" functionality for mostly all industry standard hurricane panel installation hardware.

Finally, pin holes 103A and 103B disposed in the hard car 101A and soft car 101B respectively are sized and aligned to allow a pin 15 to connect the hard car 101A and soft car 101B after they are mated. In this view, an optional ring 16 is attached to the pin 15, and when used, this optional ring 16 is intended for connecting the pin 15 to an optional extraction mechanism.

FIGS. 7D and 7E show a side view two dual stacked quick release car assemblies 100 as assembled. The hard car 101A and soft car 101B are mated and connected together with a pin 15, which also has an optional ring 16. The knurled bolt 29 is for securing a hurricane panel (not shown) to the soft car 101B. The dual stacked quick release car assembly on the right is fastened to a structure by a combination of a male direct mount hardware component 38B (in this case a male Panelmate) installed in the structure and a fastener 24 (in this case a wing nut) having thread corresponding to the male Panelmate 38B. The dual stacked quick release car assembly on the left is fastened to a structure by a combination of a female male direct mount hardware component (not shown) installed in the structure and a fastener 48 (in this case a sidewalk bolt) having thread corresponding to the female direct mount hardware. The purpose of showing both the right and left views are to illustrate that the preferred embodiment of the dual stacked quick release car assembly 101 can be used with both male and female direct mount hardware as well as with other types of installation hardware such as various types of track.

FIG. 7F shows a panel 50 attached to a structure 55 at two points with dual stacked quick release car assemblies 100. The panel 50 is fastened to each dual stacked quick release car assembly 100 by an industry standard wing nut 38, with an optional washer 39 disposed between the wing nut 38 and the panel 50. Again, in the assembly on the right, the hard car 101A is attached to the structure 55 with male direct mount hardware 39B, and in the assembly on the left the hard car 101A is attached to the structure with female direct mount hardware 48. When in use, if the pins 15 are extracted from the dual stacked quick release cars 100, the soft cars 101B will be released from each of their respective assemblies and the hurricane panel 50 will be released for removal from the structure 55. Note that after release, the soft cars 101B will remain attached to the pane 50.

FIG. 7G illustrates how the preferred embodiment of the dual stacked quick release car assembly 100 can be used as an end car to attach and transition between a hard panel 5 and a soft panel 7. At the attachment on the left, the hard panel 5 held in place by the hard car 101A when the hard car 101A is fastened to the structure 55. The soft panel 7 is fastened to both of dual stacked quick release car assemblies 100. When the pins 15 are extracted, the soft panel 7 will be released and the hard panel 5 will remain securely fastened to the structure 55.

FIGS. 7H-7N show the hard car 101A of the preferred embodiment of the dual stacked quick release car assembly shown in FIG. 7A.

FIGS. 7O-7T show the soft car 101B of the preferred embodiment of the dual stacked quick release car assembly shown in FIG. 7A.

FIGS. 7U and 7V show an alternate embodiment of a dual stacked quick release car assembly 110 with a slotted hard car 111. The assembly consists of a hard car 111 with an elongated mounting hole 115 and at least one pin hole 113; and a soft car 112 with at least one pin hole disposed to align with the pin hole 113 in the hard car 111. The soft car 112 also has a bolt hole 116 sized and disposed to accommodate a knurled bolt 117 which is installed in the soft car 112.

In use, the hard car 111 is aligned in the proper position and fastened to the structure with direct mount hardware (not shown), and the soft care 112 is mated to the hard car 111. When the two pieces are mated, they are connected together with the pin 15 and the assembly is complete. A hurricane panel is fastened to the knurled bolt 117 in the soft car 112 using industry standard hardware, typically a wing nut (not shown). As with the preferred embodiment of the dual stacked quick release car assembly, when the pin is extracted, the soft car 112 is disengaged from the hard car 111, and the hurricane panel (not shown) is released with the soft car 112 remaining attached to the hurricane panel.

The purpose of the slotted hard car 111 is to allow the position of the assembly to be adjusted to correspond with the attachment point for the second object (in this case a hurricane panel). This alternate embodiment may be useful in direct mount installations where one or more of the original male or female direct mount hardware installed in a structure has failed or otherwise needs to be replaced, and the mounting hole that needs to be retrofitted with the new hardware is or has become than the size of the hole required by the replacement hardware. In such a case, the new direct mount hardware cannot be installed in the same hole, and will no longer align with the mounting holes in the hurricane panel. The slotted hard car 111 of this alternate embodiment allows the new direct mount hardware to be offset from the point of the original installation, and allows this alternate embodiment of the dual quick release car assembly 110 to be aligned such that the knurled bolt 117 in the soft car 112 can be aligned with the original point of installation so that the knurled bolt 117 will be aligned at the proper position for installing the panel.

FIGS. 7W-7AA show the hard car 111 of an alternate embodiment of the dual stacked quick release car assembly shown in FIG. 7G.

FIGS. 7BB-7FF show the soft car 112 of an alternate embodiment of the dual stacked quick release car assembly shown in FIG. 7G.

FIGS. 8A-8C show views from different angles of the components the preferred embodiment of a dual side-by-side quick release car assembly 200 designed for use with industry standard F-Track 51. A hard car 201A has a male channel 205 sized to mate with the female channel 52 in the F-Track 51. This hard car 201A also has a pin hole 202A sized to accommodate to a pin 15 and disposed to align with the pin hole 202B in the soft car 201B when the two cars are mated. If desired, an optional set screw hole 204 can be disposed through the horizontal access of the hard car 201A, and if so an optional set screw 35 can be used to set the dual side-by-side quick release car in its place once it has been disposed and aligned in the F-Track.

The soft car 201B is disposed with a channel to mate with the hard car 201A, a pin hole 202B on both sides of the channel sized to accommodate a pin 15 and disposed to align with the pin hole 202A in the hard car 201A when the two cars are mated. The soft car 201B is also disposed with a bolt hole sized to accommodate a knurled bolt 29, and the knurled bolt 29 is installed in the soft car 201B so that the threaded end will extend away from the F-Track 51 when the dual side-by-side quick release car assembly 200 is assembled and disposed in the F-Track.

Also shown in FIGS. 8A and 8B are a ring 16 attached to the pin 15, which if included can be used to facilitate extraction of the pin 15, or to connect the pin to an extraction mechanism (not shown); an industry standard wing nut 38 which has thread corresponding to the thread on the knurled bolt 29 and which is used to fasten a hurricane panel (not shown) to the dual side-by-side quick release car assembly 200; and an optional washer 39, which if used is disposed between the wing nut 38 and the hurricane panel.

FIGS. 8F and 8G show the components of the preferred embodiment of a dual side-by-side quick release car assembly 200 in the appropriate installation sequence. On the left side, the drawing shows a dual side-by-side quick release car assembly 200 installed in an F-Track 51 which is mounted on a structure 55. A hurricane panel 50 is fastened to the dual side-by-side quick release car assembly 200 using an industry standard wing nut 39 and an optional washer 39. When the pin 15 is extracted the assembly, the soft car 201B is released from the assembly and the hurricane panel 50 can be removed. After the pin is extracted, the soft car 201B remains attached to the hurricane panel 50, and the hard car 201A remains disposed in the F-Track 51.

FIGS. 8H-8L show the hard car of the preferred embodiment of the dual side-by-side quick release car assembly of FIG. 8A.

Figure 8P:
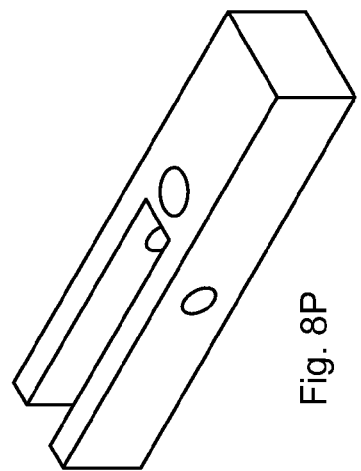
FIGS. 8M-8Q show a front, top, bottom, top perspective, and bottom perspective view, respectively, of the soft car of the preferred embodiment of the dual side-by-side quick release car assembly of FIG. 8A.
Figure 8Q:
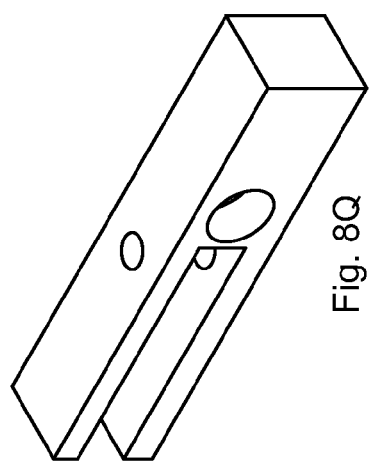
Figure 8N:
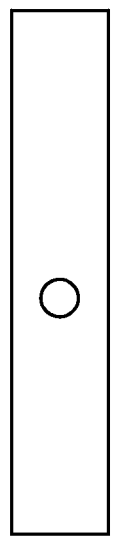
Figure 8O:
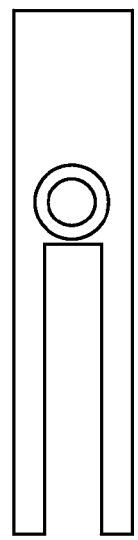
Figure 8M:
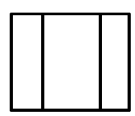

FIGS. 8M-8Q show the soft car of the preferred embodiment of the dual side-by-side quick release car assembly of FIG. 8A.

While the pins used in the various embodiments of the present invention can be extracted manually one at a time or with hardware such as pliers, ideally it is preferable to have an extraction mechanism that can extract multiple pins from multiple hardware connections. The ideal extraction mechanism should have several attributes, being light and sturdy, having a low profile so it can fit between the inboard side of a hurricane panel and a door or window, being made of components that can be disassembled for easy packaging, shipping and storage, and being expandable so that the same extraction mechanism can be used to extract the pins for one, two, three or more hurricane panels. While an extraction mechanism meeting these criteria could take many forms, one preferred embodiment four such an extraction mechanism is shown in FIG. 9A.

FIG. 9A shows the preferred embodiment of an extraction mechanism and its various components, being a handle, a reinforcement member adapted to be attached to the handle with machine screws, and optional extension members. The reinforcement arm and optional extension members, shown in FIG. 9B, provide attachment points for connecting the extraction mechanism to one or more pins of the various embodiments of the quick release bolt and quick release car assemblies.

A handle 501 has a grip 509 at one end, and at the other end at least one attachment hole 504B (four shown) for attaching a reinforcement arm 502 (discussed below), and at least one slot 508C that creates an opening for at least one connection hole 506 in the reinforcement arm 502. The two sides at the end opposite the grip 509 are tapered so that the connection holes 506 on the two ends of the reinforcement arm 502 are left exposed when the handle 501 and the reinforcement arm 502 are mated and fastened together.

A reinforcement arm 502 has at least one threaded hole 504D (four shown) to accommodate a machine screw 504A or other type of fastener for attaching the reinforcement arm 502 to the end of the handle 501 having the at least one threaded attachment hole 504B and at the least one slot 508C. The reinforcement arm 502 further having an extension hole 505 on at least one end (one on each end shown) which serves as the female connection for mating and attaching an extension member 503 (discussed below) to the reinforcement arm 502. The reinforcement arm 502 also having at least one connection hole 506.

An extension member 503 has a male end 507A for mating to the female extension hole 505 of the reinforcement arm 502 or to the female end 508A of another extension member 503. The male end 507A is disposed with two holes 507B and 507C. The outboard hole 507B is disposed to align with the at least one threaded hole 504D in the reinforcement arm and the mounting hole 508B proximate the female mating hole 508A of another extension member 503, and is used to fasten the extension member 503 to the reinforcement arm 502 or to another extension member 503. The inboard hole 507C on the male end 507A of the extension member 503 is disposed to align with the at least one connection hole 506 in the reinforcement arm 502 and the connection hole 508C proximate the female mounting hole 508A of another extension member 503.

In the preferred embodiment of the extraction mechanism, the reinforcement arm 502 is attached to the handle 501 by passing four machine screws 504A through the attachment holes 504B on the handle and threading the machine screws 504A into the threaded attachment holes 504D of the reinforcement arm 502. Once the reinforcement arm 502 is fastened to the handle 501, the extraction mechanism in its preferred embodiment is disposed to connect to three pins corresponding to three stepped quick release bolt assemblies and/or three dual quick release cars of the second embodiment of the present invention, or any combination thereof. The corresponding pins are connected to the three connection holes 506 of the reinforcement arm one or more rings 17A, lanyards 17B or a combination thereof. The pins can also be connected to the extraction mechanism by multiple rings 17A, cables, clips, carbineers or any other means for connecting two components together. This discussion is not intended to be limiting and in place of the connection holes 506 and 508C, other methods such as hooks or eye-loops or holes with thread corresponding to thread on the ends of the pins can also be used for connecting the extraction mechanism to the pins, the means being less important than the function of providing a positive connection point between the extraction mechanism and the pins to be extracted. And finally, while it is preferred to use extension members 503 in pairs (one at each end of the reinforcement arm 502 or extension member 503), the number of extension members 503 on each end of the reinforcement arm 502 can be varied, such that one end has more extension members 503 than the other, or one end has no extension members 503 and the other end has one or more extension members 503.

If the present invention is used as contemplated with hurricane panels, a single extraction mechanism can extract three pins corresponding to one panel. If it is desirable to extract more than one panel, multiple extraction mechanisms can be used, however, in the preferred embodiment the extraction mechanism can be expanded to accommodate multiple panels. By adding an extension member 503 to each end of the reinforcement arm 502 on the extraction mechanism, the extraction mechanism is expanded to correspond to releasing two hurricane panel. Likewise, adding one more extension member 503 to each extension member 503 expands the extraction mechanism to correspond to releasing three hurricane panels, and so on.

To add the extension member 503 to the reinforcement arm 502, the corresponding machine screw 504A is removed from the attachment hole 504D, as is any hardware for connecting pins. The male end 507A of the extension member 503A is inserted into the female end 505 of the reinforcement arm 502, and the two components are fastened together by passing and threading the machine screw through the mounting hole 504B in the handle 501, the attachment hole 504D on the reinforcement arm, and the mounting hole 507B of the extension member 503. Any connection hardware is replaced by passing it through the connection hole 506 of the reinforcement arm 502 and the corresponding connection hole 507C of the extension member 503. Additional connection hardware allowing the extension mechanism to service two hurricane panels is added to the connection hole 508C at the end of each extension member 503.

According to the preferred embodiment of the extraction mechanism, additional extension members 503 can be added to the end of other extension members 503, and each two extension members will expand the extraction mechanism to extract pins for one additional panel. An extension member 503 is connected to another extension member by disposing the male end 507A of the extension member 503 in the female end 508A of another extension member 503, fastening the two extension members through the attachment holes 508B, and connecting the pins to the connection holes 508C in the extension members 503. Finally, while extension members 503 are the preferred means for expanding the extraction mechanism to accommodate more pins, alternate embodiments of the reinforcement arm can be constructed to accommodate the desired number of pins without the use of extension members 503, and the extension members 503 can likewise be constructed to each accommodate more than one pin. Likewise, additional pins could be connected to the reinforcement arm 502 with lanyards or cables so that the outboard connection holes 506 of the reinforcement arm could thereby each be connected to more than one pin.

Thus the preferred embodiment of the extraction mechanism meets all the criteria desired in an extraction mechanism. When disassembled, it can be easily stored and shipped. It can be expanded to extract pins corresponding to one or more hurricane panels or other objects. When assembled, it can be disposed between the inside of a hurricane panel and the outside of a window or door, and if desired can be attached to the inboard side of a hurricane panel with hook and loop fastener, duct tape, a hook or other means for attaching one object to another, and when so attached, is readily accessible for use.

FIGS. 9C and 9D show the handle portion of the preferred embodiment of the extraction mechanism of FIG. 9A.

FIGS. 9E and 9F show the reinforcement member of the preferred embodiment of the extraction mechanism of FIG. 9A.

FIGS. 9G and 9H the optional extension member of the preferred embodiment of the extraction mechanism of FIG. 9A.

Returning to the stepped quick release bolt assembly of FIG. 1A and the single quick release car of FIG. 2A, alternate embodiments of these two components can be used to insure proper alignment of the stepped quick release bolt 1 in the single quick release car 10. For example, FIG. 10A illustrates an example of how the depth of the bolt hole 11 in the single quick release car 10 and the length of the first end 3 of the stepped quick release bolt 1 can be made to correspond so that the pin hole 6 on the stepped quick release bolt 1 will align to the proper depth to correspond with the pin hole 12 of the single quick release car 10, when the stepped quick release bolt 1 is fully inserted into the bolt hole 11 in the single quick release car 10.

Figure 10B:
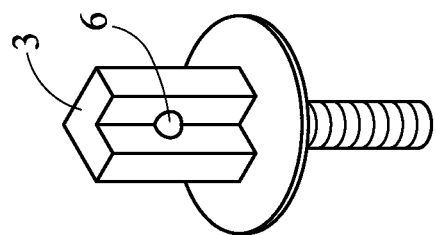
FIGS. 10B and 10C illustrate how using different shapes for the first end of the stepped quick release bolt, together with corresponding bolt holes in the single quick release car can be used to align the axis of the two pin holes.
Figure 10C:
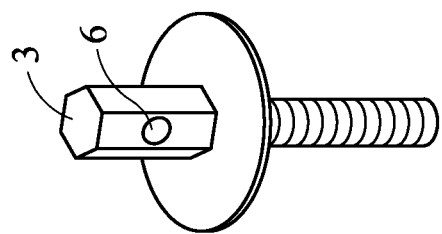
Figure 10A:
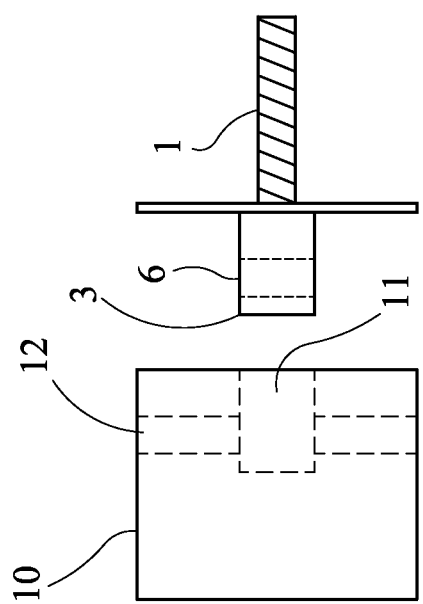
FIG. 10A illustrates an example of how the depth of the bolt hole in the single quick release car and the length of the first end of the stepped quick release bolt can be made to correspond so that the pin holes in the two components align to the correct depth when the stepped quick release bolt is inserted fully in the single quick release car.
Figure 10D:
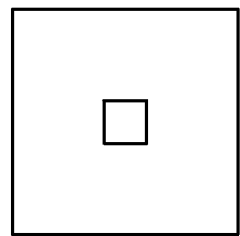
FIGS. 10D-10H illustrate examples of alternate shapes of washers that can be used with alternate embodiments and shapes of the first end of the stepped quick release bolt and the bolt hole of the single quick release cars of FIGS. 10A-10C.
Figure 10E:
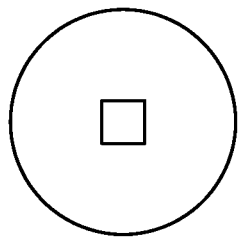
Figure 10F:
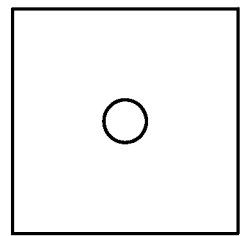
Figure 10G:
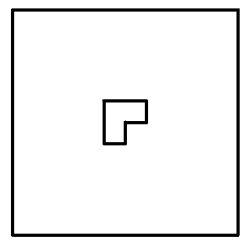
Figure 10H:
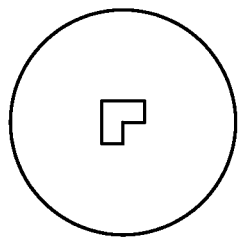

While the alternate embodiment in FIG. 10A insures that the pin holes 6 and 11 respectively will align at the proper depth, in this alternate embodiment it may still be necessary to rotate the stepped quick release bolt 1 in the bolt hole 11 to bring the access of the two pin holes into alignment in order to allow the pin to be inserted through both. Other alternate embodiments such as the ones shown in FIGS. 10B and 10C illustrate how using different shapes for the first end 3 of the stepped quick release bolt, together with corresponding bolt holes 11 in the single quick release car 10 (not shown) can be used to align the axis of the two pin holes. In these alternate embodiments, the stepped quick release bolt 1 can be inserted only one way into the bolt hole 11 of the single quick release car 10, thus insuring the axis of the bolt holes 6 and 11 are properly aligned.

When the concepts illustrated in FIGS. 10A, 10B, and 10C are combined, then the combined depth and shape of the bolt hole 11 in the single quick release car 10 correspond to the combined length and shape of the first end 3 of the stepped quick release bolt 1, and the stepped quick release bolt 1 is inserted to its full depth in the bolt hole 11, then both the depth and axis of the pin holes 6 and 12 will be in proper alignment for insertion of the pin.

Finally, it should be noted that the concepts illustrated in FIGS. 10A, 10B, and 10C, can be applied to both the single quick release car of FIG. 2A and the quick release track of FIG. 4A.

If the alternate embodiments illustrated in FIGS. 10A, 10B, and 10C are used, then alternate embodiments of the shape of the corresponding washer on the stepped quick release bolt assembly may also be used. FIGS. 10D-10H show examples of alternate shapes of washers for use with alternate embodiments and shapes of the stepped quick release bolt.

The instant invention has been shown and described herein in what is considered to be the most practical and preferred embodiments. It is recognized, however, that departures may be made therefrom within the scope of the invention and that obvious modifications will occur to a person skilled in the art. It should also be noted that attachment and release methods disclosed herein for panels are interchangeable between panels and track, such that an embodiment used to attach a panel can also be used to attach track in installations where it may be desirable to release the track (with panels attached) instead of the panels themselves. Thus either the second object can comprise not only panels, but also track or any second object that needs to be attached to a first object for quick release. Accordingly, the attachment and release mechanisms disclosed herein can be used to attach and release other components to structures and other objects, for example a quick release bolt assembly or series thereof could be used to attach and release an escape hatch from a piece of industrial machinery such as a bulldozer. Further, the bolt and pin holes of the quick release track or single quick release cars of the preferred embodiment could be disposed directly in the body of a first object such as the machinery referred to above.

What we claim is:

1. A quick release system for attaching and releasing a hurricane panel having a mounting hole, with respect to a building by a release of a retaining pin located between the building and the hurricane panel, said system comprising:
   a) a bolt having an axis, a first end with a first cross bored hole, a threaded second end sized to pass through the mounting hole in the hurricane panel and receiving a corresponding tensionable fastener on the threaded second end, the bolt further having a stepped transition between the first end and the threaded second end forming a supporting surface supporting at least one of the hurricane panel and a support for the hurricane panel against movement of the mounting hole of the hurricane panel past the stepped transition;
   b) a receiving structure configured for attachment to at least one of the building and mounting hardware attached to the building, having a front surface with a first hole having a shape corresponding to a shape of the first end of the bolt, configured to receive the bolt, and having a second cross bored hole intersecting the first hole, said second cross bored hole being positioned so that when the bolt is inserted in the first hole and captured in the receiving structure by the retaining pin passing through the second cross bore hole in the receiving structure and the first cross bored hole in the bolt, the supporting surface on the bolt is maintained at a position protruding beyond the front surface of the receiving structure, such that said at least one of the hurricane panel and the support for the hurricane panel is attached between the corresponding tensionable fastener and the supporting surface and is prevented from transferring a compression force exerted by the corresponding tensionable fastener to the receiving structure, thereby preventing binding of the retaining pin between the bolt and the receiving structure; and
   c) the retaining pin, sized to be inserted through the second cross bored hole in the receiving structure and the first cross bored hole in the bolt, to selectively retain and release, respectively, the bolt at an axial position with respect to the receiving structure so that the supporting surface protrudes beyond the front surface of the receiving structure when the retaining pin is engaged in the receiving structure and the bolt, and
   a removal of the retaining pin from the first cross bored hole in the bolt renders the bolt releasable from the receiving structure.

2. The quick release system of claim 1, further comprising the support for the hurricane panel, wherein the support for the hurricane panel is configured to be disposed between the supporting surface and the hurricane panel.

3. The quick release system of claim 2, further comprising the support for the hurricane panel, wherein the support for the hurricane panel comprises a washer having an inside diameter less than an outer diameter of the supporting surface and an outside diameter configured to be greater than a diameter of the mounting hole in the hurricane panel.

4. The quick release system of claim 1, wherein the supporting surface is configured to prevent passage of the first end of the bolt through the mounting hole and to support the hurricane panel.

5. The quick release system of claim 1, further comprising the support for the hurricane panel, wherein the bolt has a second stepped transition between the supporting surface and the second end of the bolt, and the support for the hurricane panel being disposed at the second stepped transition between the supporting surface and the second end of the bolt.

6. The quick release system of claim 5, further comprising the support for the hurricane panel, wherein the support for the hurricane panel comprises a washer having an inside diameter less than an outer diameter of the supporting surface and an outside diameter configured to be greater than a diameter of a mounting hole in the hurricane panel.

7. The quick release system of claim 6, wherein the washer is pressed on the second stepped transition.

8. The quick release system of claim 1, wherein the bolt has a second stepped transition between the first end, said second stepped transition being configured to prevent passage of the second stepped transition through the mounting hole and to support the hurricane panel.

9. The quick release system of claim 1, wherein an exterior profile of the receiving structure is configured to conform to a mounting hardware structure having a corresponding channel conforming to an exterior profile of the receiving structure so that the receiving structure slides into the channel in the mounting hardware.

10. The quick release system of claim 1, further comprising the mounting hardware, wherein the mounting hardware comprises an F-track and the receiving structure is configured to mate with the F-track.

11. The quick release system of claim 1, wherein the receiving structure is configured to receive at least two bolts and corresponding at least two retaining pins.

12. The quick release system of claim 1, wherein the receiving structure is configured to be attachable directly to the building.

13. The quick release system of claim 12, wherein the receiving structure is configured to receive at least two bolts and corresponding at least two retaining pins.

14. The quick release system of claim 1, wherein the receiving structure is configured to have at least two pairs of first and second holes to receive at least two bolts and corresponding at least two retaining pins, and to provide space for drilling a plurality of holes so the receiving structure is attachable to the building by a plurality of fasteners which penetrate respective ones of the plurality of holes and a surface of the building.

15. The quick release system of claim 1, wherein a plurality of bolts, retaining pins and receiving structures are used to attach at least one hurricane panel having multiple mounting holes to the building; and
 a mechanism configured to concurrently remove the plurality of retaining pins; and
 wherein, when the plurality of retaining pins are extracted from the first cross bored holes in the bolts, the bolts and the at least one hurricane panel are releasable from the receiving structures, rendering the at least one hurricane panel removable from the building.

16. The quick release system of claim 1, wherein a plurality of bolts and retaining pins, and at least one receiving structure configured to receive at least two bolts and corresponding at least two retaining pins are used to attach at least one hurricane panel having multiple mounting holes to the building; and
 a common extraction mechanism configured to concurrently remove the plurality of retaining pins,
 wherein, when the plurality of retaining pins are extracted from the first cross bored holes in the bolts, the bolts and the at least one hurricane panel are releasable from the at least one receiving structure rendering the at least one hurricane panel removable from the building.

17. The quick release system of claim 16, further comprising the mounting hardware for attachment to the receiving structure, the mounting hardware having a track configured to retain the receiving structure within the track, and the mounting hardware being further configured to be attached to the building.

18. The quick release system of claim 16, wherein the receiving structure is configured for direct attachment to the building by a plurality of fasteners that each penetrate the receiving structure and extend into the building, to retain the receiving structure to the building.

19. The quick release system of claim 1, wherein the corresponding tensionable fastener is selected from the group consisting of at least one of a nut and a wing nut, and the corresponding tensionable fastener applies a compression force against the hurricane panel.

20. The quick release system according to claim 1, wherein the retaining pin is connected to an extraction mechanism, the extraction mechanism being configured to concurrently apply a tension on a plurality of retaining pins to extract the plurality of retaining pins from a plurality of first cross bored holes.

21. The quick release system of claim 1, wherein the first end of the bolt and the first hole in the receiving structure are configured such that the first and second cross bored holes are self-aligning when the bolt is inserted in the first hole.

22. A quick release system for attaching and releasing a hurricane panel having a mounting hole in a face to a building, comprising:
 a) a bolt having a first end with a first cross bored hole, a threaded second end, a diameter of the second end being smaller than a diameter of the first end, the second end being threaded and configured to pass through the mounting hole in the hurricane panel, the bolt mating with a corresponding threaded fastener received on the threaded second end of the bolt and retaining at least one of the hurricane panel and a support for the hurricane panel to the bolt, an axial load bearing shoulder of the bolt being formed at a junction of the first end and the second end and preventing transference of a tensioning force of the tensionable fastener past the axial load bearing shoulder of the bolt;
 b) a receiving structure configured to be attached to at least one of the building and mounting hardware attached to the building, having a front surface with a first hole configured to accept the first end of the bolt, and a second cross bored hole intersecting the first hole disposed at a position such that when the first cross bored hole and the second cross bored hole are aligned, the axial load bearing shoulder protrudes in front of the front surface; and
 c) a pin, configured to be slidably displaceable through the first cross-bored hole in the bolt and the second cross-bored hole in the receiving structure, to:
 (i) in a first position inserted through the first cross-bored hole in the bolt and the second cross-bored hole in the receiving structure, retain the bolt in the first hole of the receiving structure, with the axial load bearing shoulder disposed in front of the front surface, and
 (ii) in a second position free of at least the first cross-bored hole in the bolt, to permit the bolt to be removed from the first hole in the front surface to release the bolt from the receiving structure.

23. The quick release system of claim 22, further comprising the support for the hurricane panel, wherein the support for the hurricane panel is disposed between the axial load bearing shoulder and the hurricane panel.

24. The quick release system of claim 23, wherein the support for the hurricane panel comprises a washer having an inside diameter less than an outer diameter of the axial load bearing shoulder and an outside diameter configured to be greater than a diameter of the mounting hole in the hurricane panel.

25. The quick release system of claim 22, wherein the bolt has a portion having a third diameter formed between the axial load bearing shoulder and the second end, and further comprising the support for the hurricane panel disposed on the portion having the third diameter, at the axial load bearing shoulder.

26. The quick release system of claim 22, further comprising the mounting hardware, wherein the mounting hardware comprises an F-track and the receiving structure is configured to mate with the F-track.

27. The quick release system of claim 22, wherein the receiving structure is configured to receive at least two pairs of bolts and corresponding pins.

28. The quick release system of claim 22, wherein the receiving structure is configured to be attachable directly to the building.

29. The quick release system of claim 22, wherein the receiving structure has at least two pairs of first holes and second cross bored holes configured to receive at least two pairs of bolts and corresponding pins, and provides space for drilling a plurality holes so the receiving structure is attachable to the building by a plurality of fasteners which penetrate respective ones of the plurality of holes and a surface of the building.

30. The quick release system of claim 22, wherein a plurality of bolts, receiving structures and pins are used to attach at least one hurricane panel having multiple mounting holes to the building, further comprising a common extraction mechanism configured to concurrently remove the plurality of pins, wherein, when the plurality of pins are extracted from a plurality of first cross bored holes in the plurality of bolts, the plurality of bolts and the at least one hurricane panel are releasable from the plurality of receiving structures, rendering the at least one hurricane panel removable from the building.

31. A quick release system comprising:

a receiving structure, a stepped bolt and a pin for attaching and releasing a second object to and from a first object, the second object having a face with at least one aperture being a mounting hole of the second object;

the stepped bolt having at least two different diameters, wherein a diameter of a first end is larger than a diameter of a second end, a first cross-bored hole being formed across the first end configured to receive the pin, the second end engaging a tensionable fastener to retain the second object between the tensionable fastener and a step transition between the first end and the second end by insertion of the second end through the at least one aperture and engaging the tensionable fastener, with the step transition supporting a force exerted by the tensionable fastener through the second object, the step transition supporting at least one of the second object and a support for the second object; and the receiving structure having a front surface and a first hole in the front surface, configured to be connected to at least one of the first object and mounting hardware attached to the first object, and to retain the first end of the stepped bolt in the first hole in the front surface, and having a second cross bored hole intersecting the first hole configured to receive the pin, wherein the first cross-bored hole is alignable with the second cross bored hole for receipt of the pin inserted through the first cross bored hole and the second cross bored hole concurrently, to capture the stepped bolt to the receiving structure, with the step transition displaced from the front surface to prevent a force from the tensionable fastener from being transferred through the at least one of the second object and the support for the second object to the front surface, to prevent binding of the pin between the bolt and the receiving structure when the tensionable fastener is engaged, wherein the pin is removable from the first cross-bored hole substantially without binding of the pin due to a tension applied by the tensionable fastener, to thereby free the stepped bolt from the receiving structure.

32. The quick release system of claim 31, wherein the bolt has a second step transition between the step transition and the second end of the bolt, and further comprising the support for the second object disposed at the second step transition between the step transition and the second object.

33. The quick release system of claim 32, wherein the receiving structure is configured to be attachable directly to the building.

34. The quick release system of claim 31, further comprising the second object, being a hurricane panel, wherein the first object comprises a building.

35. The quick release system of claim 34, further comprising the support for the hurricane panel being disposed between the step transition and the hurricane panel.

36. The quick release system of claim 35, wherein the support for the hurricane panel comprises a washer having an inside diameter less than a diameter of the step transition and an outside diameter configured to be greater than a diameter of the mounting hole in the hurricane panel.

37. The quick release system of claim 31, further comprising the mounting hardware, wherein the mounting hardware comprises an F-track and the receiving structure is configured to mate with the F-track.

38. The quick release system of claim 31, wherein the receiving structure is configured to receive at least two bolts and corresponding at least two pins.

39. The quick release system of claim 31, wherein the receiving structure is configured to have at least two first and two second holes to receive at least two bolts and corresponding at least two pins, and provides sufficient space for drilling a plurality of holes so that the receiving structure is attachable to the first object by a plurality of tensionable fasteners which penetrate respective ones of the plurality of holes and a surface of the first object.

40. The quick release system of claim 31, wherein a plurality of bolts and pins are used to attach at least one hurricane panel having multiple mounting holes to a building; and a common extraction mechanism configured to concurrently remove the plurality of pins; and wherein, when the plurality of pins are extracted from the first cross bored holes in the bolts, the bolts and the at least one hurricane panel are releasable from the at least one receiving structure rendering the at least one hurricane panel removable from the building.

* * * * *